US012633126B2

(12) United States Patent
Johnson et al.

(10) Patent No.: US 12,633,126 B2
(45) Date of Patent: May 19, 2026

(54) BIRD'S EYE VIEW (BEV) SEMANTIC MAPPING SYSTEMS AND METHODS USING MONOCULAR CAMERA

(71) Applicant: Raymarine UK Limited, Fareham (GB)

(72) Inventors: Mark Johnson, Vannes Cedez (FR); James Ross, Fareham (GB); Richard Bowden, Surrey (GB); Oscar Mendez Maldonado, Surrey (GB)

(73) Assignee: Raymarine UK Limited, Fareham (GB)

( * ) Notice: Subject to any disclaimer, the term of this patent is extended or adjusted under 35 U.S.C. 154(b) by 0 days.

(21) Appl. No.: 18/815,712

(22) Filed: Aug. 26, 2024

(65) Prior Publication Data

US 2024/0420483 A1     Dec. 19, 2024

Related U.S. Application Data

(63) Continuation of application No. PCT/US2023/063373, filed on Feb. 27, 2023, and a
(Continued)

(51) Int. Cl.
*G06V 20/56* (2022.01)
*G06T 5/77* (2024.01)
*G06T 7/10* (2017.01)

(52) U.S. Cl.
CPC .............. *G06V 20/56* (2022.01); *G06T 5/77* (2024.01); *G06T 7/10* (2017.01); *G06T 2207/20081* (2013.01); *G06T 2207/20084* (2013.01)

(58) Field of Classification Search
CPC ................ B60R 1/27; B60R 2300/607; B60R 2300/105; B60R 2300/303; G06T 2207/20084
See application file for complete search history.

(56) References Cited

U.S. PATENT DOCUMENTS 6,549,660 B1     4/2003 Lipson et al.
7,738,707 B2     6/2010 Wiedemann et al.
(Continued)

FOREIGN PATENT DOCUMENTS

CN      108052940      5/2018
CN      108876707      9/2022
(Continued)

OTHER PUBLICATIONS

Roddick T, Cipolla R. Predicting semantic map representations from images using pyramid occupancy networks. InProceedings of the IEEE/CVF conference on computer vision and pattern recognition 2020 (pp. 11138-11147). (Year: 2020).*
(Continued)

*Primary Examiner* — Clifford Hilaire
(74) *Attorney, Agent, or Firm* — Haynes and Boone, LLP

(57) ABSTRACT
Bird's eye view (BEV) semantic mapping systems and methods are provided. A method includes receiving an image captured by a monocular camera having a first point of view (POV) of an environment including a plurality of features. The method further includes processing, by an artificial neural network (ANN), the captured image to generate a semantic map for the captured image, the semantic map associated with a second POV different from the first POV. The features exhibit a uniform scale in the semantic map. Additional methods and associated systems are also provided.

20 Claims, 13 Drawing Sheets

Related U.S. Application Data continuation of application No. PCT/US2023/063369, filed on Feb. 27, 2023.

(60) Provisional application No. 63/396,210, filed on Aug. 8, 2022, provisional application No. 63/314,990, filed on Feb. 28, 2022.

(56) References Cited

U.S. PATENT DOCUMENTS

| | | | |
|---|---|---|---|
| 8,315,433 | B2 | 11/2012 | Hsu et al. |
| 8,854,463 | B2 | 10/2014 | Imamura |
| 10,467,500 | B1 * | 11/2019 | Bao .......................... G06T 9/002 |
| 10,678,256 | B2 | 6/2020 | Schulter et al. |
| 12,211,265 | B2 | 1/2025 | Ross et al. |
| 2019/0050648 | A1 * | 2/2019 | Stojanovic ............. G06V 20/13 |
| 2019/0096125 | A1 * | 3/2019 | Schulter ............... G05D 1/0088 |
| 2020/0369351 | A1 | 11/2020 | Behrendt |
| 2022/0398775 | A1 * | 12/2022 | Streem .................... G06T 17/05 |

FOREIGN PATENT DOCUMENTS

| | | |
|---|---|---|
| WO | WO2021178603 | 9/2022 |
| WO | WO2023164705 | 8/2023 |
| WO | WO2023164707 | 8/2023 |

OTHER PUBLICATIONS

Abbas et al. "A Geometric Approach to Obtain a Bird's Eye View from an Image". In: CoRR abs/1905.02231 (2019).

Arnold et al. "A comparative study of methods for transductive transfer learning." In Seventh IEEE International Conference on Data Mining Workshops (ICDMW 2007), pp. 77-82, 2007.

Bailey et al. "Simultaneous localization and mapping: part ii". In: IEEE Robotics Automation Magazine 13.3 (2006), pp. 108-117.

Bousmalis et al. "Unsupervised pixel-level domain adaptation with generative adversarial networks." CoRR, abs/1612.05424, 2016.

Bruls et al. "The right (angled) perspective: improving the understanding of road scenes using boosted inverse perspective mapping." 2019.

Cherian et al. "Sem-GAN: Semantically-Consistent Image-To-Image Translation,CoRR" abs/1908.04409, 2018.

Chopra et al. "DLID: Deep learning for domain adaptation by interpolating between domains." In ICML Workshop on Challenges in Representation Learning, 2013.

Durrant-Whyte et al. "Simultaneous localization and mapping: part i". In: IEEE Robotics Automation Magazine 13.2 (2006), pp. 99-110.

Engel et al. "Semi-dense visual odometry for a monocular camera," 2013 IEEE International Conference on Computer Vision, 2013, pp. 1449-1456.

Evangelidis et al. "Parametric image alignment using enhanced correlation coefficient maximization." IEEE Transactions on Pattern Analysis and Machine Intelligence, Institute of Electrical and Electronics Engineers, 2008, 30 (10), pp. 1858-1865.

Ganin et al. "Domain-adversarial training of neural networks," 2016.

Ghifary et al. "Domain adaptive neural networks for object recognition." CoRR, abs/1409.6041, 2014.

Ghifary et al. "Domain generalization for object recognition with multi-task autoencoders." CoRR, abs/1508.07680, 2015.

Ghifary et al. "Deep reconstruction-classification networks for unsupervised domain adaptation." CoRR, abs/1607.03516, 2016.

Gretton et al. "A kernel two-sample test. J. Mach." Learn. Res., 13(null):723-773, Mar. 2012.

Guo et al. "Beyond the line of sight: labeling the underlying surfaces". English (US). In: Computer Vision, ECCV 2012—12th European Conference on Computer Vision, Proceedings. Part 5.Oct. 2012, pp. 761-774.

Hou et al. "Convolutional neural networkbased image representation for visual loop closure detection," CoRR, vol. abs/1504.05241, 2015.

Hu et al. "FIERY: future instance prediction in bird's-eye view from surround monocular cameras".

Huang et al. "Arbitrary style transfer in real-time with adaptive instance normalization." CoRR, abs/1703.06868, 2017.

Kendall et al. "Convolutional networks for realtime 6-dof camera relocalization," CoRR, vol. abs/1505.07427, 2015.

Kim et al. "Learning to discover cross-domain relations with generative adversarial networks." CoRR, abs/1703.05192, 2017.

Leonard et al. "Simultaneous map building and localization for an autonomous mobile robot," Proceedings IROS '91: IEEE/RSJ International Workshop on Intelligent Robots and Systems, 1991, pp. 1442-1447.

Li et al. "Revisiting batch normalization for practical domain adaptation." CoRR, abs/1603.04779, 2016.

Long et al. "Learning transferable features with deep adaptation networks." In Proceedings of the 32nd International Conference on International Conference on Machine Learning—vol. 37, ICML'15, p. 97-105. JMLR.org, 2015.

Lu et al. "Monocular semantic occupancy grid mapping with convolutional variational autoencoders," CoRR, vol. abs/1804.02176, 2018.

Lu et al. "Monocular semantic occupancy grid mapping with convolutional variational encoder-decoder networks". In: IEEE Robotics and Automation Letters 4.2 (Apr. 2019), pp. 445-452.

Mani et al. "MonoLayout: Amodal scene layout from a single image." 2020.

Mur-Artal et al. "ORB-SLAM: a versatile and accurate monocular SLAM system." IEEE Transactions on Robotics, 31(5):1147-1163, 2015.

Mur-Artal et al. "ORB-SLAM2: an open-source SLAM system for monocular, stereo and RGB-D cameras." IEEE Transactions on Robotics, 33(5):1255-1262, 2017.

Pan et al. "Cross-view semantic segmentation for sensing surroundings". In: IEEE Robotics and Automation Letters 5.3 (Jul. 2020), pp. 4867-4873.

Philion et al. "Lift, splat, shoot: encoding images from arbitrary camera rigs by implicitly unprojecting to 3D". In: CoRR abs/2008.05711 (2020).

Ragot et al. "Benchmark of visual slam algorithms: ORB-SLAM2 vs RTAB-Map," 2019 Eighth International Conference on Emerging Security Technologies (EST), 2019, pp. 1-6.

Rao et al. R1-cyclegan: "Reinforcement learning aware simulation-to-real." CoRR, abs/2006.09001, 2020.

Regmi et al. "Cross-view image synthesis using conditional GANs." 2018.

Roddick et al. "Orthographic feature transform for monocular 3D object detection." CoRR, abs/1811.08188, 2018.

Roddick et al. "Predicting Semantic Map Representations From Images Using Pyramid Occupancy Networks", 2020 IEEE/CVF Conference on Computer Vision and Pattern Recognition (CVPR), IEEE, Jun. 13, 2020 (Jun. 13, 2020), pp. 11135-11144.

Ross et al., "BEV-SLAM: Building a Globally-Consistent World Map using Monocular Vision," IEEE RJS Int. Conf. on Intelligent Robots and Systems (IROS) Oct. 23-27, 2022.

Saha et al. "Enabling spatio-temporal aggregation in birds-eyeview vehicle estimation". In: ICRA (2021).

Saha et al. "Translating Images into Maps", 2022 International Conference on Robotics and Automation (ICRA) Oct. 3, 2021 (Oct. 3, 2021), pp. 9200-9206 Retrieved from the Internet: URL: https://arxiv.org/pdf/2110.00966vl.pdf [retrieved on Apr. 21, 2023] Sections III and IV; figure 2.

Saha et al. "The Pedestrian next to the Lamppost" Adaptive Object Graphs for Better Instantaneous Mapping, 2022 IEEE/CVF Conference on Computer Vision and Pattern Recognition (CVPR), IEEE, Jun. 18, 2022 (Jun. 18, 2022), pp. 19506-19515.

Schulter et al. "Learning to look around objects for top-view representations of outdoor scenes". In: CoRR abs/1803.10870 (2018).

Sengupta et al. "Automatic dense visual semantic mapping from street-level imagery". In: 2012 IEEE/RSJ International Conference on Intelligent Robots and Systems. 2012, pp. 857-862.

(56) References Cited

OTHER PUBLICATIONS

Sun et al. "Return of frustratingly easy domain adaptation." CoRR, abs/1511.05547, 2015.

Tighe et al. "Scene parsing with object instances and occlusion ordering". In: 2014 IEEE Conference on Computer Vision and Pattern Recognition. 2014, pp. 3748-3755.

Tzeng et al. "Deep domain confusion: Maximizing for domain invariance." CoRR, abs/1412.3474, 2014.

Wang et al. "Deep visual domain adaptation: A survey." In Neurocomputing, 2018.

Weiss et al. "A survey of transfer learning." Journal of Big Data, 2016.

Winkelbauer et al. "Learning to localize in new environments from synthetic training data," CoRR, vol. abs/2011.04539, 2020.

Yi et al. "Unsupervised dual learning for image-to-image translation." CoRR, abs/1704.02510, 2017.

Zhai et al. "Predicting ground-level scene layout from aerial imagery". In: CoRR abs/1612.02709 (2016).

Zhu et al. "Unpaired image-to-image translation using cycle-consistent adversarial networks." CoRR, abs/1703.10593, 2017.

Zhu et al. "Generative adversarial frontal view to bird view synthesis." 2019.

Zhuang et al. "Supervised representation learning: Transfer learning with deep autoencoders." In Proceedings of the 24th International Conference on Artificial Intelligence, IJCAI'15, p. 4119-4125. AAAI Press, 2015.

* cited by examiner

BIRD'S EYE VIEW (BEV) SEMANTIC MAPPING SYSTEMS AND METHODS USING MONOCULAR CAMERA

CROSS-REFERENCE TO RELATED APPLICATIONS

This application is a continuation of International Patent Application No. PCT/US2023/063369 filed Feb. 27, 2023 and entitled "Bird's Eye View (BEV) Semantic Mapping Systems And Methods Using Monocular Camera," which is hereby incorporated by reference in its entirety.

International Patent Application No. PCT/US2023/063369 claims priority to and the benefit of U.S. Provisional Patent Application No. 63/314,990 filed Feb. 28, 2022 and entitled "BIRD'S EYE VIEW (BEV) DOMAIN TRANS-FER," which is hereby incorporated by reference in its entirety.

International Patent Application No. PCT/US2023/063369 also claims priority to and the benefit of U.S. Provisional Patent Application No. 63/396,210 filed Aug. 8, 2022 and entitled "BIRD'S EYE VIEW SIMULTANEOUS LOCALIZATION AND MAPPING SYSTEMS AND METHODS," which is hereby incorporated by reference in its entirety.

This application is a continuation of International Patent Application No. PCT/US2023/063373 filed Feb. 27, 2023 and entitled "Bird's Eye View (BEV) Semantic Mapping Systems And Methods Using Plurality Cameras," which is hereby incorporated by reference in its entirety.

International Patent Application No. PCT/US2023/063373 claims priority to and the benefit of U.S. Provisional Patent Application No. 63/314,990 filed Feb. 28, 2022 and entitled "BIRD'S EYE VIEW (BEV) DOMAIN TRANS-FER," which is hereby incorporated by reference in its entirety.

International Patent Application No. PCT/US2023/063373 also claims priority to and the benefit of U.S. Provisional Patent Application No. 63/396,210 filed Aug. 8, 2022 and entitled "BIRD'S EYE VIEW SIMULTANEOUS LOCALIZATION AND MAPPING SYSTEMS AND METHODS," which is hereby incorporated by reference in its entirety.

TECHNICAL FIELD

The present disclosure relates generally to mapping systems and methods and, more particularly for example, to systems and methods related to bird's eye view (BEV) semantic mapping.

BACKGROUND

Maneuvering vehicles with complex dynamics in tight spaces can be challenging. To improve spatial reasoning, it is useful to have a visual aid that captures the overall layout and useful geometry of the scene. Likewise, advanced automated assistance systems may require an environmental representation that simplifies navigation tasks such as path planning.

A top-down surround view meets these requirements and satisfies both use cases. For human use, a photorealistic view resembling satellite imagery is preferred, whereas for down-stream automated tasks a semantically-segmented represen-tation is ideal. In the maritime domain, there is a lack of available data, and obtaining significant quantities can be costly, logistically challenging, and subject to local restric-tions.

In view of the foregoing, there is a continued need for improved systems and methods for semantic mapping.

BRIEF SUMMARY

Various embodiments of the present disclosure include a method including receiving an image captured by a mon-ocular camera having a first point of view (POV) of an environment including a plurality of features. The method further includes processing, by an artificial neural network (ANN), the captured image to generate a semantic map for the captured image. The semantic map is associated with a second POV different from the first POV. The features exhibit a uniform scale in the semantic map.

Various embodiments of the present disclosure include a system including a monocular camera configured to capture an image of an environment including a plurality of features, the monocular camera having a first point of view (POV). The system further includes an artificial neural network (ANN) configured to process the captured image to generate a semantic map for the captured image. The semantic map is associated with a second POV different from the first POV. The features exhibit a uniform scale in the semantic map.

Various embodiments of the present disclosure include a method including receiving a plurality of images captured by a plurality of monocular cameras having different points of view (POVs) of an environment. The method further includes processing, by an artificial neural network (ANN), the images to generate a plurality of semantic maps of the environment associated with the images, the semantic maps having a shared POV. The method further includes process-ing the semantic maps to generate a combined semantic map of the environment having the shared POV.

Various embodiments of the present disclosure include a system including a plurality of monocular cameras having different points of view (POVs) of an environment, the plurality of monocular cameras configured to capture a plurality of images. The system further includes an artificial neural network (ANN) configured to process the images to generate a plurality of semantic maps of the environment associated with the images, the semantic maps having a shared POV. The ANN is further configured to process the semantic maps to generate a combined semantic map of the environment having the shared POV.

The scope of the invention is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
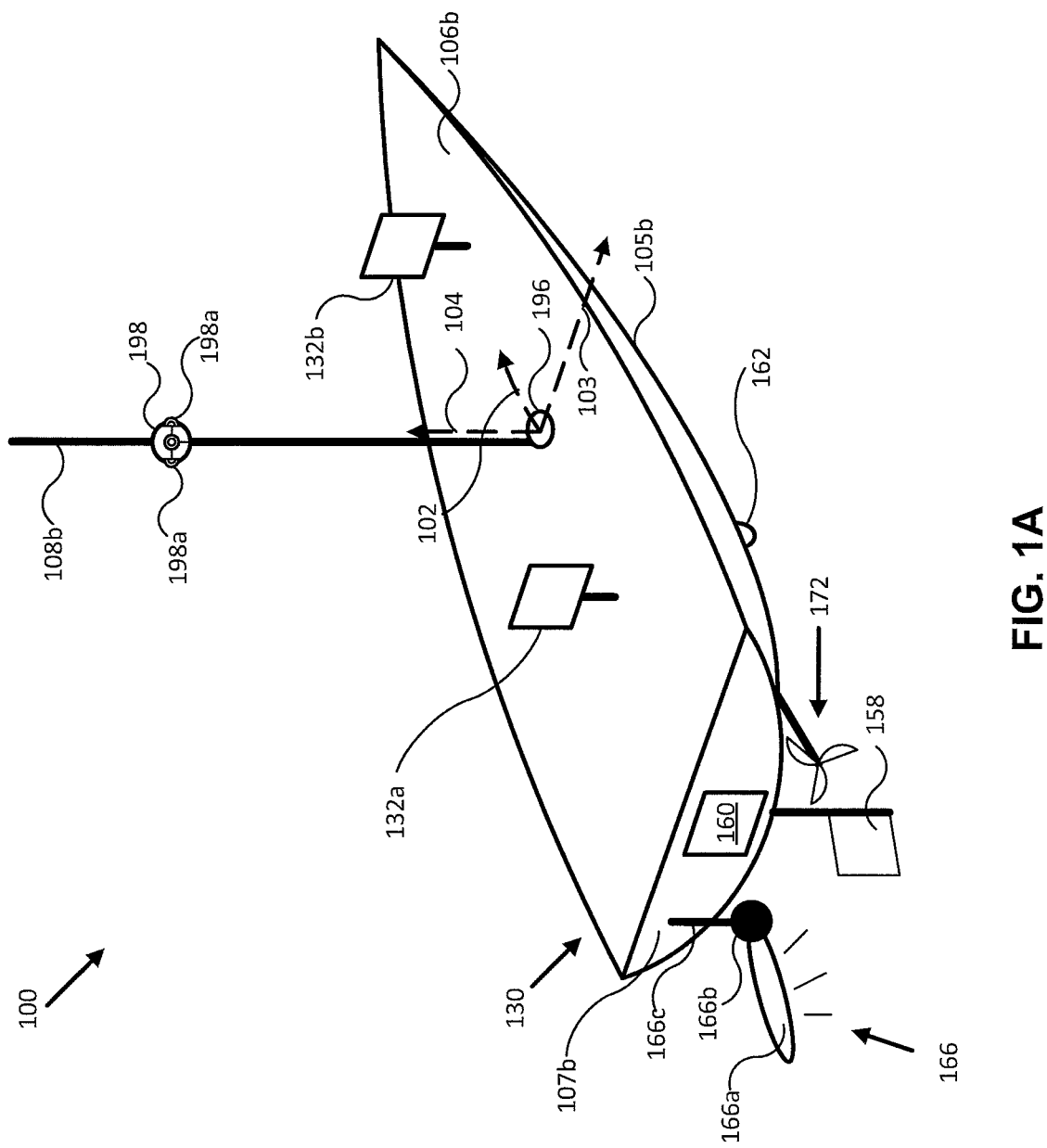
FIG. 1A illustrates an example mobile structure with a 360-degree imaging system configured for marine object search, detection and/or classification, according to one or more embodiments of the disclosure.
Figure 1B:
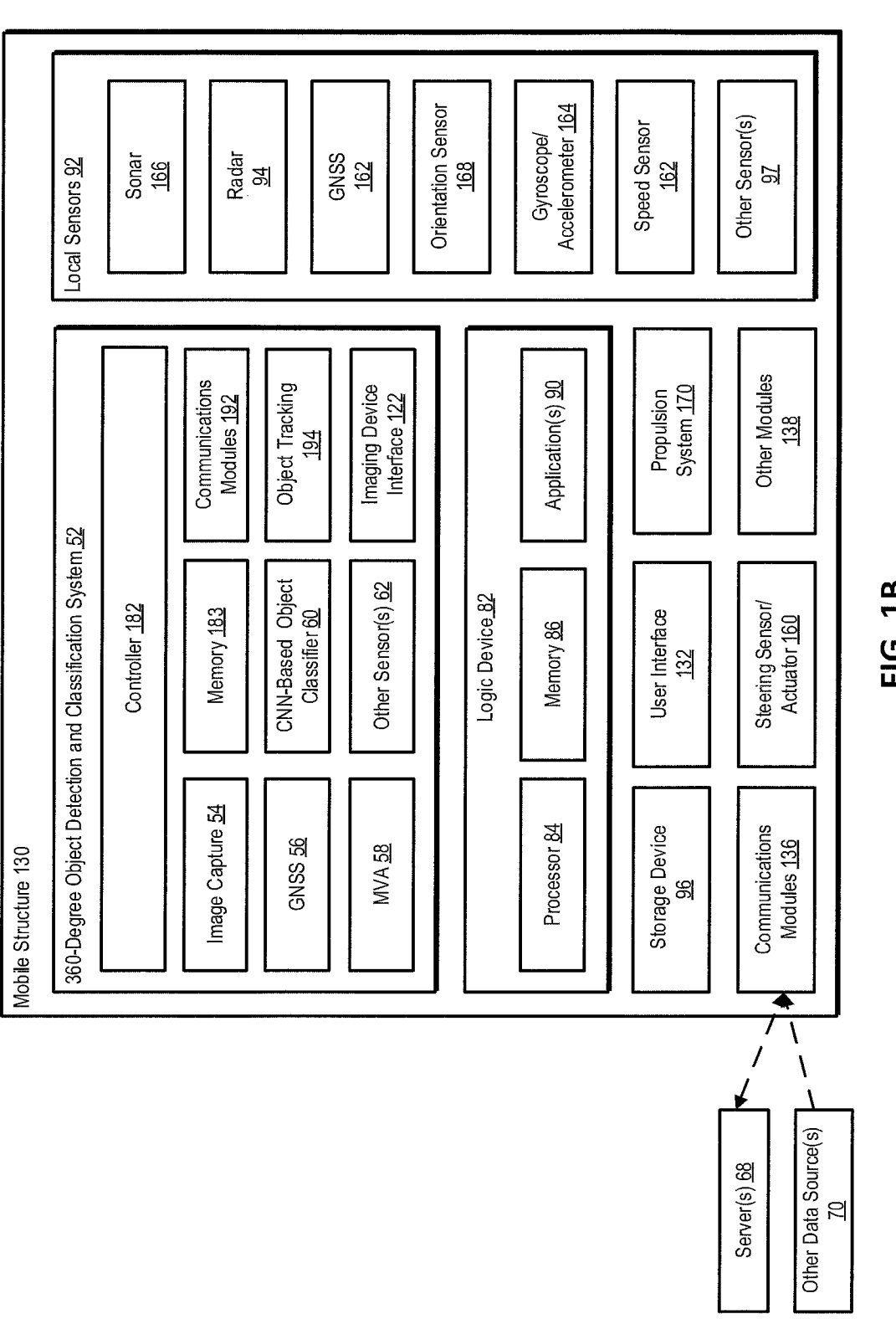
FIG. 1B illustrates a block diagram of example system components for use with the mobile structure of FIG. 1A, according to one or more embodiments of the disclosure.

FIGS. 1A and 1B illustrate a mobile structure 130 with a 360-degree imaging system 198 in accordance with an embodiment of the disclosure. As illustrated, a system 100 includes the mobile structure 130, the 360-degree imaging system 198, and various other components configured to provide navigational data or other data outputs/analytics for use with operation of mobile structure 130. For example, system 100 may include sonar system 166, integrated user interface/controller 132a and/or 132b, steering sensor/actuator 160, sensor cluster 196 (e.g., orientation sensor 168, gyroscope/accelerometer 164, GNSS 162, and/or other modules 138 such as radar systems), and various other sensors and/or actuators.

In the embodiment illustrated by FIG. 1A, mobile structure 130 is implemented as a motorized boat including a hull 105b, a deck 106b, a transom 107b, a mast/sensor mount 108b, a rudder 158, an inboard motor 172, and an actuated sonar system 166 coupled to transom 107b. In other embodiments, hull 105b, deck 106b, mast/sensor mount 108b, rudder 158, inboard motor 172, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

The mobile structure 130 includes 360-degree imaging system 198, which includes one or more image capture components 198a. The imaging system 198 is mounted in an elevated position on the mobile structure 130, such as on mast/sensor mount 108b or on a radar device, to provide unobstructed, or substantially unobstructed 360-degree views surrounding the mobile structure 130. In some embodiments, the imaging system 198 is positioned to capture 360-degree views of the surface of the water from a distance proximate to the boat to the horizon. The imaging system 198 may be implemented as a plurality of wide angle image capture devices capturing a 360-degree view surrounding the mobile structure 130. In another embodiment, the imaging system 198 may comprise at least one imaging camera 198a and a rotating mechanism/mount configured to rotate the camera to capture a full 360-degree panoramic view.

In some embodiments, the imaging system 198 includes processing and communications components providing communications between the imaging system 198 and user interface/controller 132a and/or 132b, which may be adapted to receive image and/or object data from the imaging system 198 and provide instructions for activating and/or controlling the operation of the imaging system 198. In another embodiment, user interface/controller 132a and 132b may be configured to adjust the position of the imaging system 198, including controlling rotation of a 360-degree rotating camera.

The mobile structure 130 further includes an actuated sonar system 166, which in turn includes transducer assembly 166a coupled to transom 107b of mobile structure 101 through assembly bracket/actuator 166b and transom bracket/electrical conduit 166c. In some embodiments, assembly bracket/actuator 166b may be implemented as a roll, pitch, and/or yaw actuator, for example, and may be adapted to adjust an orientation of transducer assembly 166a according to control signals and/or an orientation (e.g., roll, pitch, and/or yaw) or position of mobile structure 130 provided by user interface/controller 132a and/or 132b. For example, user interface/controller 132a and/or 132b may be adapted to receive an orientation of transducer assembly 166a configured to ensonify a portion of surrounding water and/or a direction referenced to an absolute coordinate frame, and to adjust an orientation of transducer assembly 166a to retain ensonification of the position and/or direction in response to motion of mobile structure 130, using one or more orientations and/or positions of mobile structure 130 and/or other sensor information derived by executing various methods described herein.

In another embodiment, user interface/controller 132a and 132b may be configured to adjust an orientation of transducer assembly 166a to direct sonar transmissions from transducer assembly 166a substantially downwards and/or along an underwater track during motion of mobile structure 130. In such embodiment, the underwater track may be predetermined, for example, or may be determined based on criteria parameters, such as a minimum allowable depth, a maximum ensonified depth, a bathymetric route, and/or other criteria parameters. Transducer assembly 166a may be implemented with a sonar orientation and/or position sensor (OPS), which may include one or more sensors corresponding to orientation sensor 168, gyroscope/accelerometer 164, and/or GNSS 162, for example, that is configured to provide absolute and/or relative positions and/or orientations of transducer assembly 166a to facilitate actuated orientation of transducer assembly 166a.

In one embodiment, user interfaces 132a/b may be mounted to mobile structure 130 substantially on deck 106b and/or mast/sensor mount 108b. Such mounts may be fixed, for example, or may include gimbals and other leveling mechanisms/actuators so that a display of user interfaces 132a/b can stay substantially level with respect to a horizon and/or a "down" vector (e.g., to mimic typical user head motion/orientation), for example, or so the display can be oriented according to a user's desired view. In another embodiment, at least one of user interfaces 132a/b may be located in proximity to mobile structure 130 and be mobile/portable throughout a user level (e.g., deck 106b) of mobile structure 130. For example, a secondary user interface may be implemented with a lanyard, strap, headband, and/or other type of user attachment device and be physically coupled to a user of mobile structure 130 so as to be in proximity to the user and mobile structure 130. Other embodiments of the user interface may include a portable device that is not physically coupled to the user and/or mobile structure 130. In various embodiments, user interface 132a/b may be implemented with a relatively thin display that is integrated into a PCB or other electronics of the corresponding device or structure in order to reduce size, weight, housing complexity, and/or manufacturing costs.

In some embodiments, speed sensor 163 may be mounted to a portion of mobile structure 130, such as to hull 105b, and be adapted to measure a relative water speed. In some embodiments, speed sensor 163 may be adapted to provide a thin profile to reduce and/or avoid water drag. In various embodiments, speed sensor 163 may be mounted to a portion of mobile structure 130 that is substantially outside easy operational accessibility. Speed sensor 163 may include one or more batteries and/or other electrical power storage devices, for example, and may include one or more water-powered turbines to generate electrical power. In other embodiments, speed sensor 163 may be powered by a power source for mobile structure 130, for example, using one or more power leads penetrating hull 105b. In alternative embodiments, speed sensor 163 may be implemented as a wind velocity sensor, for example, and may be mounted to mast/sensor mount 108b to have relatively clear access to local wind.

As illustrated in FIG. 1A, the mobile structure 130 may include direction/longitudinal axis 102, direction/lateral axis 103, and direction/vertical axis 104 meeting approximately at mast/sensor mount 108b (e.g., near a center of gravity of mobile structure 130). In one embodiment, the various axes may define a coordinate frame of mobile structure 101, 360-degree imaging system 198, and/or sensor cluster 196. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100 and/or mobile structure 130.

Each element of system 100 may be located at positions different from those depicted in FIG. 1A. Each device of system 100 may include one or more batteries or other electrical power storage devices, for example, and may include one or more solar cells or other electrical power generating devices. In some embodiments, one or more of the devices may be powered by a power source for mobile structure 130. As noted herein, each element of system 100 may be implemented with an antenna, a logic device, and/or other analog and/or digital components enabling that element to provide, receive, and process sensor signals and interface or communicate with one or more devices of system 100. Further, a logic device of that element may be adapted to perform any of the methods described herein.

Referring to FIG. 1B, example processing components of the system 100 for use in a marine object detection, localization and classification implementation will now be described in accordance with one or more embodiments. As illustrated, a 360-degree object detection and classification system 52 includes imaging sensors that capture image data and processing components that analyze and generate object data. The sensors and components include image capture components 54 to capture images of the marine environment, global navigation satellite system components 56 to determine the location of the object detection and classification system 52 and/or detected objects, a marine video analytics system 58 to detect an object in a captured image and identify a region of interest for further processing, a CNN-based object classifier 60 to identify an object appearing in the region of interest, and/or other sensors 62. The captured/generated data may be stored in the memory 183 and/or communicated to a logic device 82 or other components of the system 100, for storing and/or processing the object detection data.

The 360-degree object detection and classification system 52 analyzes images captured from the image capture components 54 to detect objects, determine the location of detected objects and/or classify detected objects, and/or communicate data (including captured images) to other components of the system 100. The 360-degree object detection and classification system 52 further includes a controller 182, communications modules 192, object tracking components and an imaging device interface 122. The MVA 58 may be used for analyzing captured images for the presence of desired objects. The CNN-based object classifier 60 may include one or more trained neural networks configured to receive 360-degree panoramic image data and/or data from other sensors 62 and output an object classification and/or confidence level (e.g., a probability) of the classified object being at the identified location. In one embodiment, the GNSS position 56 and orientation of the mobile structure is used to identify the and track the location of the detected objects.

The system 100 may comprise a mobile structure (e.g., a boat or other vessel) with a plurality of local sensors 92 and processing components, such as logic device 82. The local sensors 92 may include a sonar system 166, a radar system 94, a global navigation satellite system 162 (e.g., GPS), an orientation sensor 168, a gyroscope/accelerometer 164, a speed sensor 163 and/or other sensors 97 (e.g., wireless communications components). The logic device 82 includes a processor 84, memory 86, and one or more applications 90 for processing data received from the local sensors 92, the 360-degree object detection and classification system 52, and other system components. In some embodiments, the logic device 82 is configured to use data from the local sensors 92 and the 360-degree object detection and classification system to detect and identify objects and record their geographical location, which may include objects on the surface, and objects that are deep within a water column that are not detectable by the 360-degree object detection and classification system 52. For example, the sonar system 166 may be configured to record sea surface temperature, estimate sea bottom density/material, and/or identify fish or other marine life based on sonar data. The applications 90 may include an integrated fish finding algorithm that can detect fish in the water column and an embedded convolutional neural network that can identify the fish species and size.

Data from the 360-degree object detection and classification system 52, local sensors 92, and stored data (e.g., data stored in storage device 96 and/or data received from external devices such as one or more servers 68 or other external data sources 70 received through a communications module 136) can be combined, searched, filtered, and analyzed to provide actions, reports, and recommendations. Reports and recommendations can be rendered on a user interface 132 (e.g., a touchscreen display) to an operator or as an overlay on cartographic, sonar or navigation data. The data may include objects detected from the 360-degree object detection and classification system 52, recent marine reports from external sources, data received from other vessels, data received from local sensors 92, and previously received sensor data and/or processing results, such as previous object locations, stored in the storage device 96.

In operation, the 360-degree object detection and classification system 52 is configured to capture images from a location on the vessel that provides a substantially unobstructed 360-degree (or near 360-degree) view of the water surface from a location proximate to the mobile structure 130 to the horizon. The image data from the object detection and classification system 52 may be supplemented by (and/or may supplement) the data from the local sensors 92. The object detection and classification system 52 may be configured with a marine video analytics module 58 that is configured to receive a 360-degree image from the image capture components 54 and detect water-based objects. The system be configured with deep learning algorithms (e.g., CNN-based object classifier 60) that are trained to identify, localize and classify desired marine objects from the captured 360-degree images. In some embodiments, the 360-degree object detection and classification system 52 is further configured to incorporate experience-based insights (e.g., logged data in storage device 96) into the object identification, localization and classification analysis (e.g., location of known objects such as buoys).

The systems and methods of the present disclosure may be implemented to detect and identify a variety of objects including vessels (e.g., sailboats, powerboats), buoys, floating debris, person(s) in the water (e.g., person overboard), and other objects. After identification of the object, further analysis may be conducted to achieve a desired result for the user. For example, the detection of birds feeding on fish or debris around which fish congregate can be used in a fish finding application. The identification of another vessel may be used to provide the operator with an alert, and/or to update a navigation or autonomous piloting application to avoid a collision. The operator and/or system may analyze the results and make a determination regarding whether to navigate to a detected object location, navigate away from a detected object location, and/or to take another action.

In various implementations, the 360-degree object detection and classification system 52 and vessel systems (e.g., local sensors 92, including sonar, radar, GPS, etc.), are further configured to collect environmental data to supplement the image processing. Examples of the environmental data collected by these system sensors include date and time, GPS location, sea surface temperature, fish location and depth (from sonar-based fish alarm), fish type and size (from sonar-based CNN), bottom density and composition estimation (e.g., from sonar-based bottom material algorithm), bird flock size and location (from radar-based algorithm), and other data. Data from both the 360-degree object detection and classification system 52 and vessel-based local sensors 92 may be amalgamated in real-time and/or stored as logged data in storage device 96 for the use of future operations. Data may be manually filtered to display only desired information, and/or used in an automatic data analysis process that provides object information with an associated confidence level of the classification.

In various embodiments, the MVA 58 and/or CNN 60 processing may be implemented on a processing system embedded within an 360-degree object detection and classification system 52 (e.g., controller 182), in one or more other components of the system 100 (e.g., processor 84 through an application 90 that processes image data received from the 360-degree object detection and classification system 52), through a networked or cloud computing system (e.g., server 68) or another component of the mobile structure 130. In one approach, the object detection and classification system 52 stores pre-trained MVA 58 and CNN 60 algorithms to facilitate real-time processing of images captured by the image capture components 54. The captured data and/or analysis results may then be communicated to other components of the system 100 (e.g., a vessel MFD) for further processing. The data from the 360-degree object detection and classification system 52 may include, but is not limited to, MVA notation objects (e.g., located object brackets), CNN notation objects and labels (e.g., identified object brackets and/or object classification labels), object location(s), and other data outputs.

In some systems, the MVA/CNN processing is performed by a multi-function display (MFD) of the system 100. The MFD may be configured to perform multi-sensor system processing (image, sonar, radar, etc.), receiving exported data from the 360-degree object detection and classification system 52 (e.g., raw or pre-processed image data) and other sensor data from the local sensors 92. In some embodiments, the MVA/CNN may be provided as a separate logic device operable to communicate with the object detection system and the MFD of a vessel.

In some embodiments, the image capture components 54 include a camera mount that may be implemented as an actuated gimbal mount, for example, that may be controlled by controller 182 to stabilize the image capture components 54 relative to the horizon. As such, a camera mount may be configured to provide a relative orientation of image capture components 54 (e.g., relative to the horizon) to controller 182 and/or communications module 192. In other embodiments, a camera mount may be implemented as a fixed mount. In various embodiments, the camera mount may be configured to provide power, support wired communications, provide a shutter, and/or otherwise facilitate operation of the object detection and classification system 52.

Image capture components 54 may be implemented as a sensor array adapted to detect visible light images received through an optical assembly. In another embodiment, the image capture components 54 may be implemented as a cooled and/or uncooled array of detector elements, such as quantum well infrared photodetector elements, bolometer or microbolometer based detector elements, type II superlattice based detector elements, and/or other infrared spectrum detector elements that can be arranged in a focal plane array. Image capture components 54 may include one or more logic devices (e.g., similar to controller 182) that can be configured to process imagery captured by sensors/detector elements of imaging capture components 54 before providing the imagery to memory 183 or communications module 192.

In some embodiments, image capture components 54 may be implemented with a second or additional imaging modules, for example, that may include detector elements configured to detect other spectrums, such as visible light, infrared, ultraviolet, and/or other spectrums or subsets of spectrums. In various embodiments, such additional imaging modules may be calibrated or registered to image capture components 54 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view. The object detection and classification system 52 may be adapted to detect and classify objects in one or more of the images captured from one or more of the imagine modules. For example, in one embodiment analysis of infrared images may be used to detect objects on the surface of the body of water, while analysis of visible spectrum images may be used to detect objects that are underwater.

Communications module 192 may be implemented as any wired and/or wireless communications module configured to transmit and receive analog and/or digital signals between elements of system 100. For example, communications module 192 may be configured to transmit captured images from image capture components 54 to communications module 136. In other embodiments, communications module 192 may be configured to receive control signals (e.g., control signals directing capture, focus, selective filtering, and/or other operation) from processor 84 and/or user interface 132. In some embodiments, communications module 192 may be configured to support spread spectrum transmissions, for example, and/or multiple simultaneous communications channels between elements of system 100.

Memory 183 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 183 may also be implemented, at least in part, as removable memory, such as a secure digital memory card for example including an interface for such memory.

In various embodiments, data generated by the 360-degree object detection and classification system 52 and/or local sensors 92 may be processed (e.g., by 360-degree object detection and classification system 52, and/or logic device 82) and displayed to a user through use of user interface 132 (e.g., one or more displays such as a multi-function display (MFD), a portable electronic device such as a tablet, laptop, or smart phone, or other appropriate interface) and/or stored in memory (e.g., memory 183 of the 360-degree object detection and classification system 52, storage device 96 of the system 100) for later viewing and/or analysis.

In various embodiments, the 360-degree object detection and classification system 52 is used to improve marine-based object search, detection, identification and tracking. The image data may be used to detect and identify marine objects, aid in the piloting of the mobile structure towards or away from an identified marine object, and/or in performing other tasks with the mobile structure and/or network systems (which may be accessed through communications modules 136). In some embodiments, system 100 may be configured to use captured images to control operation of a vessel navigation system and/or automatic piloting system of the mobile structure 130. The logic device 82 may be further configured to control an imaging device interface 122 which may include activating, positioning and instructing the image capture components (e.g., to adjust a camera mount to aim the camera towards a particular direction).

Processor 84 and controller 182 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations. Such software instructions may also implement methods for processing captured images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a machine-readable medium such as memory 183 and memory 86 may be provided for storing non-transitory instructions for loading into and execution by processor 84 and controller 182, respectively. In these and other embodiments, the processor 84 and controller 182 may be implemented with other components where appropriate, such as volatile memory, non-volatile memory, one or more interfaces, and/or various analog and/or digital components for interfacing with components of system 100. For example, a processor may be adapted to store sensor signals, sensor information, parameters for coordinate frame transformations, calibration parameters, sets of calibration points, and/or other operational parameters, over time, and provide such stored data to an operator using user interface 132. In some embodiments, the various processing components may be integrated with one or more component of system 100 or distributed as multiple logic devices within system 100.

Gyroscope/accelerometer 164 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 130 and providing such measurements as sensor signals that may be communicated to other devices of system 100 (e.g., user interface 132 or logic device 82).

GNSS 162 may be implemented according to any global navigation satellite system, including a GPS, GLONASS, and/or Galileo based receiver and/or other device capable of determining absolute and/or relative position of mobile structure 130 based on wireless signals received from space-born and/or terrestrial sources (e.g., eLoran, and/or other at least partially terrestrial systems), for example, and capable of providing such measurements as sensor signals that may be communicated to various components of system 100.

Communications module 136 may be implemented as any wired and/or wireless communications module configured to transmit and receive analog and/or digital signals between components of system 100. Communications module 136 may be configured to receive images (e.g., still images or video images) captured from 360-degree object detection and classification system 52 and relay the images to logic device 82 and/or other components of the system 100. In some embodiments, communications module 136 may be configured to support spread spectrum transmissions, for example, and/or multiple simultaneous communications channels between components of system 100 and/or external devices.

User interface 132 of system 100 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 136 of system 100) to other devices of system 100. User interface 132 may also be implemented with one or more logic devices that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of mobile structure 130, location and classification of detected objects, and/or other elements of system 100. For example, user interface 132 may be adapted to display a time series of positions, headings, and/or orientations of mobile structure 130 and/or other elements of system 100 overlaid on a geographical map, which may include one or more graphs indicating a corresponding time series of actuator control signals, sensor information, and/or other sensor and/or control signals. In another example, recorded data from the object detection system 52, sonar system 166 and radar system 94 of the mobile structure 130, for example, can be combined, searched, filtered, analyzed, and combined with external data to provide reporting and recommendations. This data/recommendation can be displayed as a report or as a layer that is overlaid on cartographic, sonar or navigation data. In some embodiments, user interface 132 may be adapted to accept user input including a user-defined target heading, waypoint, route, desired object for detection, and/or orientation for an element of system 100, for example, and to generate control signals.

Communications module 136 may be implemented as any wired and/or wireless communications module configured to transmit and receive analog and/or digital signals between elements of system 100. Communications module 136 may be configured to receive captured image data (e.g., still images or video images) from image capture components 54 and/or object detection and identification results and related data from 360-degree object detection and classification system 52, through communications module 192.

Sonar system 166 may be configured to image a body of water and/or a seafloor located nearby the mobile structure 130. Sonar system 166 may detect objects within the body of water and/or the seafloor. Sonar system 166 may output or provide sonar data to logic device 82. Orientation sensor 168 may be implemented as one or more of a compass, float, accelerometer, and/or other device capable of measuring an orientation of mobile structure 130 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer 164 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 130 and providing such measurements as sensor signals that may be communicated to other devices of system 100.

Orientation sensor 168 is configured to measure an orientation of the mobile structure and/or image capture components 54 (e.g., magnitude and direction of roll, pitch, and/or yaw, relative to one or more reference orientations such as gravity and/or Magnetic North) and providing such measurements as sensor signals that may be communicated to various devices of system 100. GNSS 162 may be implemented according to any global navigation satellite system, including a GPS, GLONASS, and/or Galileo based receiver and/or other device capable of determining absolute and/or relative position of the mobile structure 130 and/or image capture component 54 based on wireless signals received from space-born and/or terrestrial sources, for example, and capable of providing such measurements as sensor signals that may be communicated to various devices of system 100.

The mobile structure 130 may include navigational sensors such as a steering sensor/actuator 160, a speed sensor 163, a gyroscope/accelerometer 164, a global navigation satellite system (GNSS) 162, and/or other sensors 97. Other sensors 97 may include other and/or additional sensors, actuators, communications modules/nodes, cooled or uncooled optical filters, and/or user interface devices used to provide additional environmental information associated with the mobile structure 130, for example. In some embodiments, other sensors 97 may include a humidity sensor, a wind and/or water temperature sensor, a barometer, a radar system, a visible spectrum camera, an infrared camera, a GNSS, a nepholometer, an ozone sensor, a carbon monoxide and/or dioxide sensor, a HDR imaging device, and/or other environmental sensors providing measurements and/or other sensor signals that can be displayed to a user and/or used by image capture components 54 or other devices of system 100.

Steering sensor/actuator 160 may be adapted to physically adjust a heading of mobile structure 130 according to one or more control signals, user inputs, and/or stabilized attitude estimates provided by a controller of system 100, such as logic device 82. Steering sensor/actuator 160 may include one or more actuators and control surfaces (e.g., a rudder or other type of steering or trim mechanism) of mobile structure 130 and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 130. In some embodiments, propulsion system 170 may be non-articulated, for example, such that the direction of motive force and/or thrust generated by propulsion system 170 is fixed relative to a coordinate frame of mobile structure 130. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 160, for example, such that the direction of generated motive force and/or thrust is variable relative to a coordinate frame of mobile structure 130. Non-limiting examples of articulated propulsion systems include, for example, an outboard motor for a watercraft, an inboard motor for a watercraft with a variable thrust vector/ port (e.g., used to steer the watercraft), a sail, or an aircraft propeller or turbine with a variable thrust vector, for example.

Other modules 138 may include other and/or additional sensors, actuators, communications modules/nodes, and/or user interface devices used to provide additional environmental information of mobile structure 130, for example. In some embodiments, other modules 138 may include a humidity sensor, a wind and/or water temperature sensor, a barometer, a radar system, a visible spectrum camera, an infrared camera, lidar systems, a salinity sensor such as a sea surface salinity sensor, and/or other environmental sensors providing measurements and/or other sensor signals that can be displayed to a user and/or used by other devices of system 100 (e.g., controller 182) to provide operational control of mobile structure 130 and/or system 100 that compensates for environmental conditions, such as wind speed and/or direction, swell speed, amplitude, and/or direction, and/or an object in a path of mobile structure 130, for example. In some embodiments, other modules 138 may include one or more actuated devices (e.g., spotlights, infrared and/or visible light illuminators, infrared and/or visible light cameras, radars, sonars, lidar systems, and/or other actuated devices) coupled to mobile structure 130, where each actuated device includes one or more actuators adapted to adjust an orientation of the device, relative to mobile structure 130, in response to one or more control signals. Additionally, other modules 138 may also include orientation and/or position sensors associated with sensors of the other modules 138. The orientation and/or position sensors may be incorporated within the sensors of the other modules 138 or may be separate from the sensors of the other modules 138.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, Wi-Fi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices.

Figure 2:
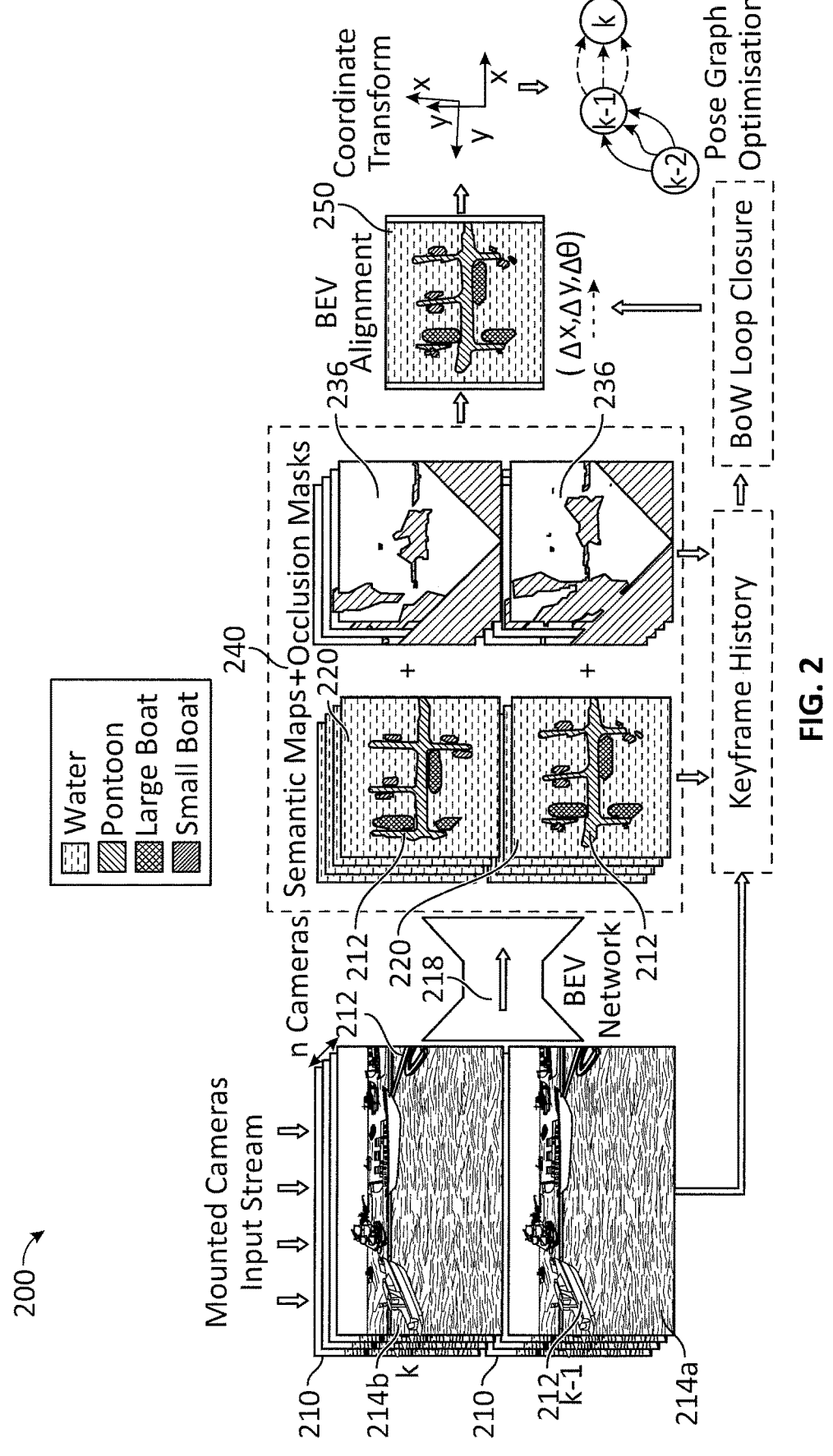
FIG. 2 illustrates a process diagram of an example system configured to generate one or more semantic maps for one or more captured images of an environment, according to one or more embodiments of the disclosure.

FIG. 2 illustrates a process diagram of a system 200 configured to generate one or more semantic maps for one or more captured images of an environment, according to one or more embodiments of the disclosure. Depending on the application, system 200 may be implemented using object detection and classification system 52 and/or system 100, described above, although other configurations are contemplated. For example, system 200 may be implemented to facilitate docking/undocking, among other maneuvering and/or navigation procedures, for mobile structure 130, as described herein. In embodiments, system 200 may be implemented by controller 182 and/or logic device 82, described above.

System 200 may be a neural network-based predictor to estimate one or more semantic maps or other map estimates based on images captured of an environment, such as the maritime environment surrounding mobile structure 130. In embodiments, a top-down (e.g., orthographic) projection may be preferred due to simplified planning/navigation tasks in the orthographic space. In such embodiments, system 200 may be a bird's eye view (BEV) predictor, such as based on simultaneous location and mapping (SLAM), although other configurations are contemplated.

In embodiments, a BEV-SLAM may be developed using the common recursive Bayesian SLAM formulation, where ego pose and map estimates are represented by the probability distribution:

$$P(x_k, m | Z_{0:k}, U_{0:k}, x_0) \qquad \text{(Equation 1)}$$

where x is the ego vehicle pose, m is the BEV map, Z are landmark observations in orthographic BEV space, and U is the alignment between subsequent BEV maps for timestep k. This can be separated into a sensor model:

$$P(z_k | x_k, m) \qquad \text{(Equation 2)}$$

and a motion model:

$$P(x_k | x_{k-1}, u_k) \qquad \text{(Equation 3)}$$

in accordance with Bayes' Theorem and the Markov assumption.

A pose graph may be built using alignment of BEV map predictions from monocular images to obtain an initial estimate for the current pose from Equation 3. Landmarks observed in the BEV plane, and alignment between the corresponding semantic maps, can then be used to add additional edges to the graph. A pose graph optimization may be performed to obtain pose estimates $x_{0:k}$, and the original BEV maps may be combined accordingly to produce a top-down semantic map $m \in R^{W \times H \times C}$ for C classes. Alternatively, BEV-SLAM can be deployed in an online fashion, where Equations 2 and 3 are computed simultaneously, and pose optimization is performed periodically.

System 200 may include a pyramid occupancy network. For example, an input image may be passed through a ResNet and feature pyramid at multiple scales, then collapsed along the Y-axis and expanded in the Z direction. A multi-scale transformer layer may be applied to remove perspective distortion (considering the focal length of imaging system 198), and the output decoded. System 200, or at least portions thereof, may be trained using a multi-scale dice loss across C classes and N scales:

$$L_{dice} = 1 - \frac{1}{|C|} \sum_{c=1}^{c} \frac{2 \sum_i^N \hat{t}_i^C t_i^C}{\sum_i^N \hat{t}_i^C + t_i^C + \epsilon} \qquad \text{(Equation 4)}$$

where $$\hat{t}_i^C$$

is the ground truth occupancy and $$t_i^C$$

is the network prediction (e.g., a small constant to prevent division by zero).

In embodiments, an extra output layer may enable system 200 to predict an occlusion mask in addition to a semantic map. The predicted occlusion mask can be used for downstream alignment tasks, such as to improve the accuracy and temporal consistency of odometry measurements. In embodiments, specific rules may be introduced to determine whether small objects should be considered occluded. For example, smaller object classes may be assumed to be entirely visible, even if the objects are partially occluded, and the area to the far surface not considered occluded if the front is visible. For example, system 200 may reasonably infer shape and size provided part of a small object is visible (assuming system 200 has sufficient spatial reasoning to accurately predict the depth of such classes).

Given a pair of predicted semantic maps and occlusion masks, an optimal alignment may be determined, which is then transformed to an ego vehicle odometry measurement (e.g., for mobile structure 130). Since BEV maps are already in orthographic space, and mounted camera height may remain unchanged, the alignment problem may reduce to a similarity transform. In such embodiments, an enhanced correlation coefficient may be used to find a suitable alignment in the BEV plane, although other configurations are contemplated. In embodiments, the predicted occlusion reasoning is used as a mask when calculating this metric, to ensure that only temporally consistent regions are used for alignment. An optimal alignment $\Delta x^*$, $\Delta y^*$, $\Delta\theta^*$ may be determined based on the following:

$$\underset{\Delta x, \Delta y, \Delta\theta}{\text{argmin}} \left\| \left[ \frac{i_r}{\|i_r\|} - \frac{i_w}{\|i_w\|} \right] \odot M_{OCC_r} \odot M_{OCC_w} \right\|^2 \qquad \text{(Equation 5)}$$

where $i_r$ is a zero-mean version of the reference BEV map, $i_w = f(\Delta x, \Delta y, \Delta\theta)$ is the zero-mean warped map, and $M_{OCC_r}$, $M_{OCC_w}$ are the corresponding binary occlusion masks. k·k may denote the L2 norm and element-wise multiplication. Constant motion may be used as an initial estimate for the optimization algorithm.

Alignment can be ineffective when there is little geometry visible from a single camera's viewpoint. However, motion cues can then be provided from additional cameras mounted around the ego vehicle (e.g., around mobile structure 130). To incorporate multiple sensors, the optimal alignment (e.g., Equation 5) must be transformed into an SE2 ($\Delta X$, $\Delta Y$, $\Delta\theta$) odometry measurement in the ego vehicle coordinate frame. The appropriate transformation matrix can be obtained using the camera extrinsic matrix relative to the ego vehicle, applying a correction to account for the center of rotation being at the ego vehicle center:

$$M = G \left( [R|T] - \left[ 0 \middle| \begin{matrix} x_0\cos\theta + y_0\sin\theta \\ y_0\cos\theta - x_0\sin\theta \\ 0 \end{matrix} \right] \right) \qquad \text{(Equation 6)}$$

where G is the camera extrinsic matrix, R and T are the BEV alignment rotation and translation matrices respectively, $\theta$ is the alignment angle, and $(x_0, y_0)$ is the ego vehicle center of rotation in the BEV pixel coordinate frame. This correction may give a transformation matrix M representing ($\Delta X$, $\Delta Y$, $\Delta\theta$) in the ego vehicle frame, which is then added as an edge in a pose graph.

In embodiments, potential loop closures may be identified using a visual bag of words (BoW) with SIFT features on the input images, implemented as a tree for efficient storage. When the likelihood exceeds a set threshold, the loop closure is verified using alignment in the BEV space. BEV maps may be considered to be unrelated if their correlation coefficient after alignment is below 0.7, or if the alignment algorithm does not converge. Otherwise, a new edge may be added to the pose graph, and pose graph optimization may be performed.

Using camera extrinsic matrices and the rotational correction (e.g., Equation 6), loop closures can be identified across multiple cameras. For example, a landmark can be observed from one camera on one pass, and from the other side on the return journey, and the two keyframes associated correctly.

Referring to FIG. 2, an image 210 of an environment including a plurality of features 212 may be captured by a monocular camera having a first point of view (POV). For example, imaging camera 198a of mobile structure 130, described above, may capture an image of the maritime environment surrounding mobile structure 130. The first POV may be a generally outward looking view, such as a front, rear, or side view of the environment relative to mobile structure 130, although other configurations are contemplated.

As shown, multiple images 210 of the environment may be captured at different points in time. For instance, one or more first images 210 may be captured at time k-1, and one or more second images 210 may be captured at time k, and so on. Depending on the application, the multiple images may be captured by the same monocular camera or by a plurality of monocular cameras having respective or different POVs. For example, a set of monocular cameras may capture a first set of images 214a at time k-1, and a second set of images 214b at time k, and so on. In other embodiments, the multiple images 210 may be captured by a single monocular camera over time.

With continued reference to FIG. 2, an artificial neural network (ANN) 218 may generate a semantic map 220 for each capture image 210, such as in a manner as described herein. For instance, ANN 218 may process a single captured image 210 to generate a single semantic map 220 for the image 210. In embodiments, ANN 218 may process multiple images 210 to generate respective semantic maps 220 for each image 210 of the captured images 210. For example, ANN 218 may process a plurality of images 210 to generate a plurality of semantic maps 220 of the environment associated with the captured images 210. Each semantic map 220 generated by ANN 218 may be associated with a second POV different from the first POV. For example, the second POV may be a BEV representation of the environment independent from the first POV, although other configurations are contemplated, including non-BEV POVs. In such embodiments, the semantic maps 220 may have a shared POV, such as the same BEV representation of the environment, although other configurations are contemplated.

Semantic map 220 may identify one or more features of image(s) 210. For example, as shown in FIG. 2, semantic map 220 may visually distinguish or highlight water from a boat, a dock, or other features found in image(s) 210. In embodiments, system 200 may classify one or more boats identified in image(s) 210, such as distinguishing between pontoons, large boats, and small boats, although other configurations are contemplated. The classifications may facilitate the occlusion reasoning described herein, such as the generation of an occlusion mask as described below.

As shown, the features 212 of image(s) 210 transferred to semantic map(s) 220 may exhibit a uniform scale in the semantic map(s) 220. For example, features 212 may exhibit the same uniform scale in each respective semantic map 220 relative to each other to facilitate consistency across the maps, such as to facilitate docking/undocking, among other maneuvering and/or navigation procedures for mobile structure 130. Additionally, or alternatively, the semantic map 220 may be metrically accurate and/or an orthographic map to visually aid the navigator of mobile structure 130. ANN 218 may be similar to the neural networks described herein (e.g., CNN-based object classifier 60).

In embodiments, ANN 218 may generate an occlusion mask 236 for each captured image 210. Occlusion mask 236 may identify locations in image 210 without direct line of sight, such as areas positioned behind obstacles and other obstructions where spatial reasoning is needed to assume the physical space behind such obstacles and obstructions. Each occlusion mask 236 may be paired with a semantic map 220 generated for the same image 210 to define a plurality of semantic map and occlusion mask pairs 240 (hereinafter "pairs" for sake of convenience without intent to limit). As shown, a first set of pairs 240 may be associated with the first set of images 214a, and a second set of pairs 240 may be associated with the second set of images 214b, although other configurations are contemplated.

The pairs 240 may be processed to generate an updated semantic map 250 of the environment. For example, the various semantic maps 220 may be combined or otherwise aggregated, and the semantic maps 220 aligned (e.g., in a manner as described herein) to generate the updated semantic map 250. In embodiments, a plurality of semantic maps 250 may be processed to generate a combined semantic map similar to updated semantic map 250, the combined semantic map having the shared POV discussed above. The updated or combined semantic map 250 may be updated or refined over time. For example, occluded areas in the updated semantic map 250 may be filled in over time using one or more additional semantic maps 220 created from corresponding additional captured images 210.

With continued reference to FIG. 2, a semantic map (e.g., semantic map 220 and/or updated semantic map 250) may be aligned to a coordinate frame of mobile structure 130, such as using a coordinate frame transformation matrix (e.g., Equation 6, described above). In embodiments, image drift may be removed from a resulting semantic map (e.g., semantic map 220 and/or updated semantic map 250), such as via pose graph optimization described herein.

Figure 3:
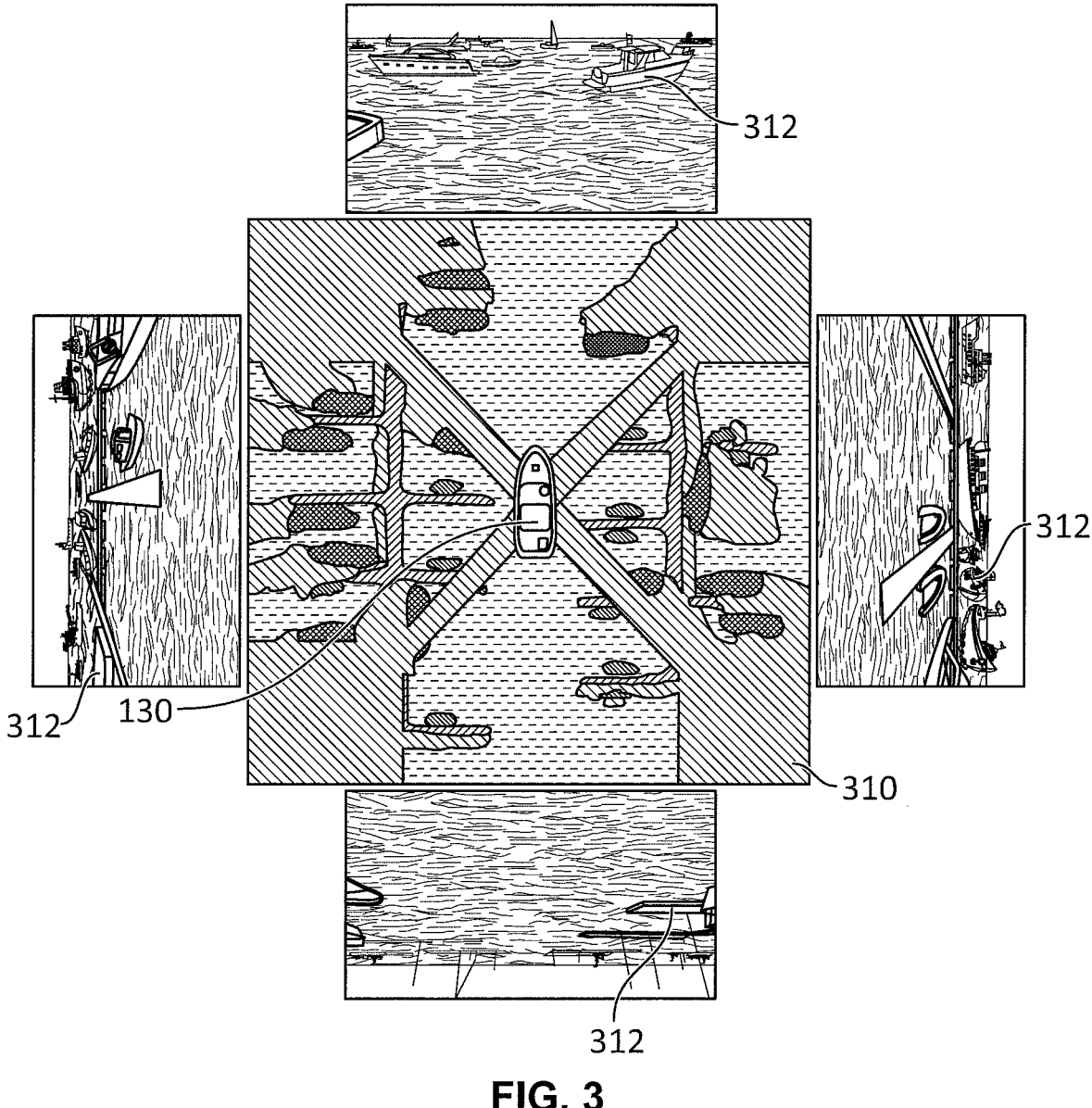
FIG. 3 illustrates example bird's eye view (BEV) predictions from monocular cameras mounted around a mobile structure, according to one or more embodiments of the disclosure.

FIG. 3 illustrates example BEV predictions from monocular cameras (e.g., image capture components 198a) mounted around mobile structure 130, according to one or more embodiments of the disclosure. Referring to FIG. 3, a semantic map 310 may be generated based on input images 312, such as using system 200 described above. As shown, mobile structure 130 may be positioned (e.g., artificially or synthetically) at the center of semantic map 310 to provide an intuitive spatial reasoning of mobile structure 130 relative to one or more features or obstacles in semantic map 310. Semantic map 310 may be a top-down view, such as a BEV representation, although other configurations are contemplated.

Figure 4:
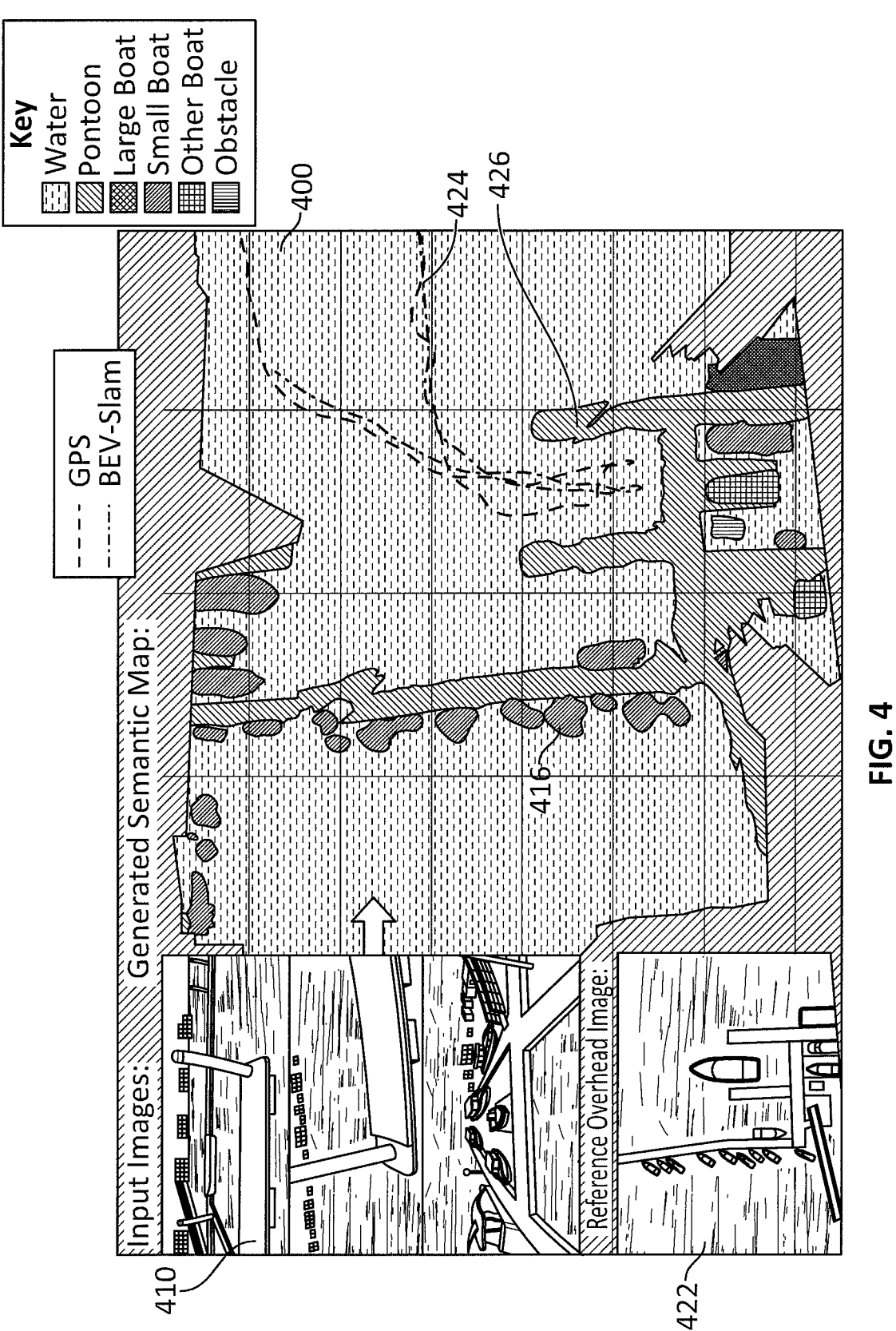
FIG. 4 illustrates an example semantic map generated for a maritime docking/undocking sequence, according to one or more embodiments of the disclosure.

FIG. 4 illustrates an example semantic map 400 generated for a maritime docking/undocking sequence, according to one or more embodiments of the disclosure. Referring to FIG. 4, semantic map 400 may be generated using system 200 described above. For example, a neural network (e.g., ANN 218) may generate semantic map 400 based on input images 410, such as in a manner as described herein. Using images 410, one or more objects 416 (e.g., boats, dock, obstacles, etc.) may be identified and located on semantic map 400 relative to mobile structure 130. For reference, an overhead image 422 is shown to compare semantic map 400 generated from images 410 in a different image plane. In embodiments, the overhead image 422 may be used to validate or help generate semantic map 400. In addition, a boat path 424 (e.g., entry and exit paths to a dock 426) is shown for illustration purposes, although other configurations are contemplated.

Figure 5:
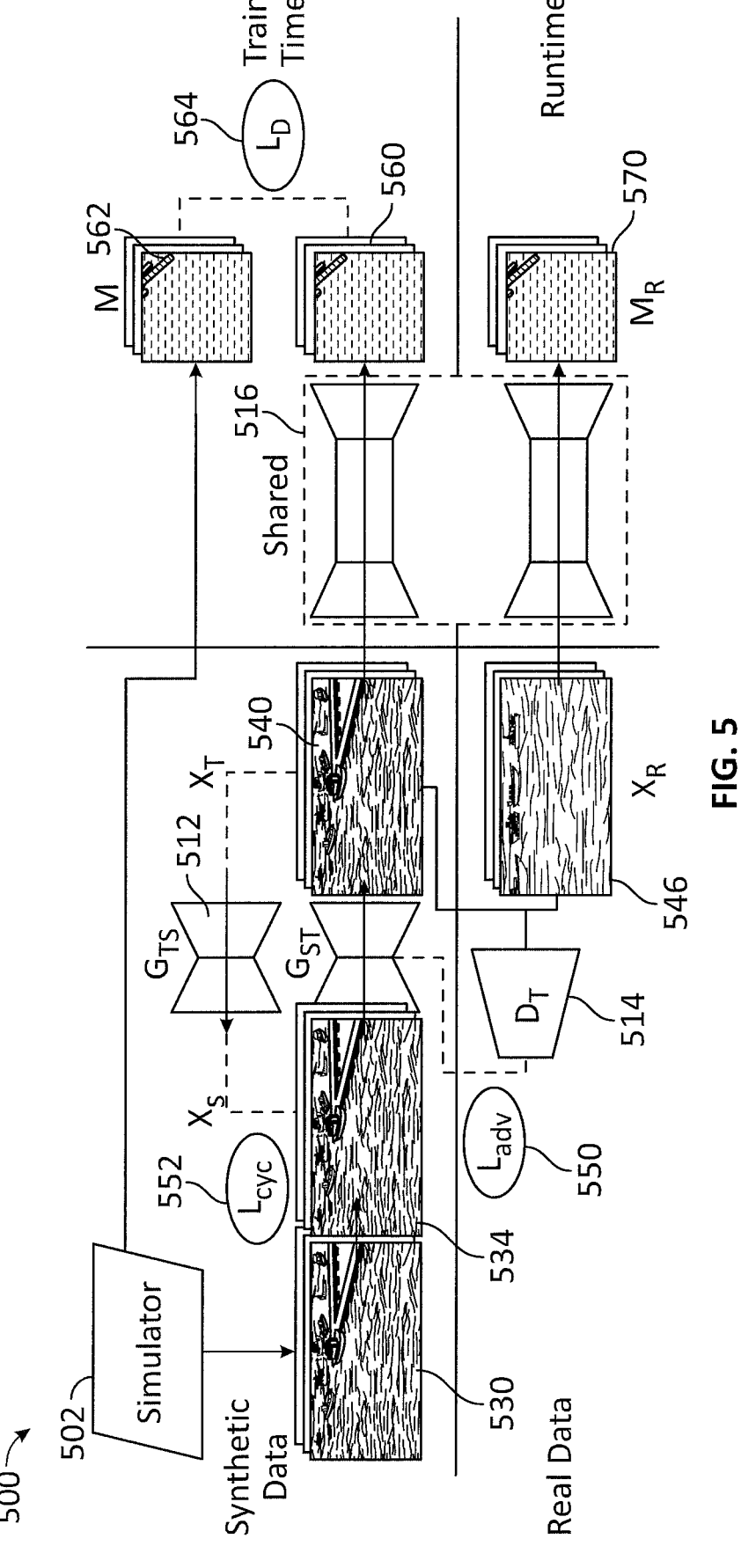
FIG. 5 illustrates an example system configured to generate one or more semantic maps based on simulated and/or actual images of an environment, according to one or more embodiments of the disclosure.

FIG. 5 illustrates an example system 500 configured to generate one or more semantic maps based on simulated and/or actual images of an environment, according to one or more embodiments of the disclosure. System 500 may be implemented using object detection and classification system 52 and/or system 100, described above, such as to facilitate docking/undocking, among other maneuvering and/or navigation procedures, for mobile structure 130, as described herein. In embodiments, system 500 may be implemented by controller 182 and/or logic device 82, described above.

In embodiments, system 500 includes a neural network having a ResNet-9 generator and a multi-scale ResNet-50 backbone followed by a dense transformer layer and top-down parser network. For example, system 500 includes a simulator 502, a first network portion 510 ($G_{ST}$), a second network portion 512 ($G_{TS}$), a third network portion 514 ($D_T$), and a fourth network portion 516, although other configurations are contemplated.

Simulator 502 may be configured to generate one or more synthetic or simulated images 530 (e.g., of a maritime environment). Images 530 may be raw, unfiltered, or otherwise unsuitable for further processing. In such embodiments, system 500 may preprocess images 530, such as normalizing images 530 with respect to a horizon, among other preprocessing, to generate refined synthetic or simulated images 534. As shown, images 534 may be provided to $G_{ST}$ 510.

$G_{ST}$ 510 takes simulation outputs $i_S \in I_S$ and translates them to an intermediate representation $i_T \in I_T$ that resembles real-world images $i_R \in I_R$ from cameras mounted around an ego vehicle (e.g., image capture components 198a mounted around mobile structure 130). For example, $G_{ST}$ 510 takes images 534 and translates them to intermediate images 540. To ensure feature similarity, third network portion, or discriminator, $D_T$ 514 is used to differentiate between the intermediate representation (e.g., intermediate images 540) and real-world images 546 and $G_{TS}$ 512 to ensure reversibility. In embodiments, system 500 may be trained using adversarial losses ($L_{adv}$) 550 and/or cyclic losses ($L_{cyc}$) 552, although other configurations are contemplated.

As shown, system 500 outputs a semantic map, such as top-down semantic maps $m \in R^{W \times H \times C} \in M$ with width W and height H for C classes, and is trained using Equation 4 above. In embodiments, system 500 is trained using a multi-scale dice loss for N scales, as per below:

$$L_{dice} = 1 - \frac{1}{|C|} \sum_{c=1}^{c} \frac{2 \sum_{i}^{N} \hat{m} \odot m}{\sum_{i}^{N} \hat{m} + m + \epsilon} \qquad \text{(Equation 7)}$$

where $\hat{m}$ is the ground truth occupancy map and $\odot$ represents element-wise multiplication ($\epsilon$ is a small constant to prevent division by zero).

As shown, fourth network portion 516 may process synthetic and/or actual images to generate one or more semantic maps. For instance, during train time, fourth network portion 516 may generate one or more synthetic semantic maps 560 based on intermediate images 540. Synthetic semantic map(s) 560 may be compared against one or more simulated semantic maps 562 generated by simulator 502, and system 500 (e.g., fourth network portion 516) trained using detected losses ($L_D$) 564, although other configurations are contemplated. During runtime, fourth network portion 516 may generate one or more semantic maps 570 based on real-world images 546, such as in a manner as described herein.

With continued reference to FIG. 5, the introduction of $G_{ST}$ 510 allows the remainder of system 500 to run independently for inference on real-world frontal images. If some ground truth is available in the target domain, a portion of system 500 (e.g., $G_{ST}$ 510) can be fine-tuned on that data, increasing generalization ability of system 500. The source and target domains can also be swapped, reversing the role of $G_{ST}$ 510 and $G_{ST}$ 512. In such embodiments, $D_T$ 514 is fed images from simulator 502, and $G_{ST}$ 510 is provided real-world images 546. In this manner, the intermediate representation $I_T$ may have reduced complexity than the simulation outputs $I_S$, resulting in more consistent predictions.

Figure 6:
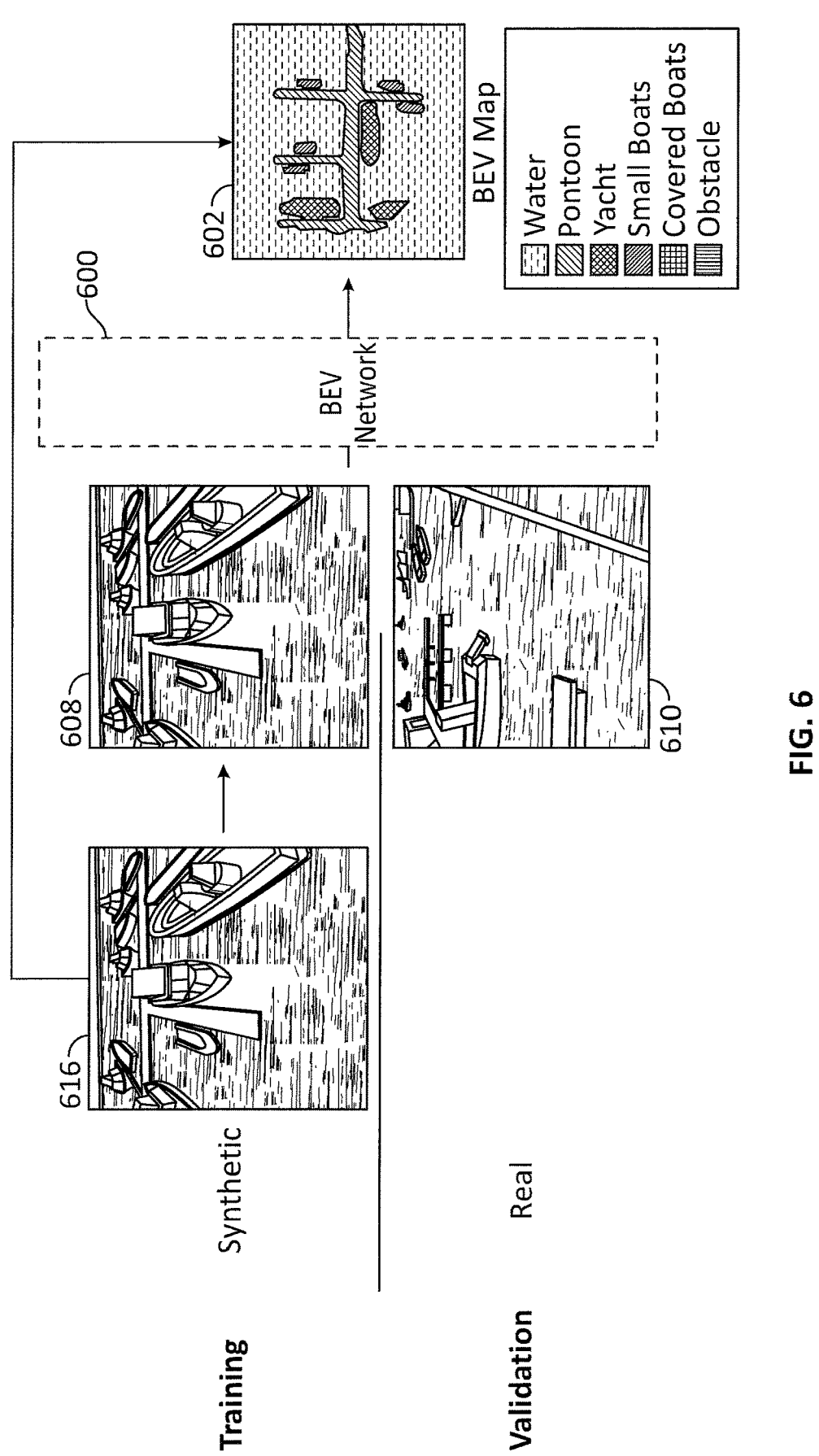
FIG. 6 illustrates another system configured to generate one or more semantic maps based on simulated and/or actual images of an environment, according to one or more embodiments of the disclosure.

FIG. 6 illustrates another system 600 configured to generate one or more semantic maps based on simulated and/or actual images of an environment, according to one or more embodiments of the disclosure. Except as otherwise noted below, system 600, which may be referred to as a BEV network without intent to limit, may be similar to the systems described herein (e.g., system 200, system 500, etc.). For example, system 600 may include various neural networks, network portions, or the like to generate a semantic map 602 based on a synthetic image 608 and/or an actual image 610, such as in a manner as described herein. In embodiments, synthetic data/images may be used to train system 600, and real or actual data/images may be used during validation or runtime operations of system 600, similar to system 500 described above. System 600 may be implemented using object detection and classification system 52 and/or system 100, described above, such as to facilitate docking/undocking, among other maneuvering and/or navigation procedures, for mobile structure 130, as described herein. In embodiments, system 600 may be implemented by controller 182 and/or logic device 82, described above In embodiments, the synthetic image 608 may be a refined image of a base simulated image 616, such as an image normalized with respect to a horizon among other preprocessing to generate an image that appears similar to a real image, as described above. Base image 616 may be used to train system 600 based on a comparison with semantic map 602, such as in a manner as described herein. As shown, the semantic map 602 may be a BEV map having various features distinguished or otherwise highlighted. For instance, semantic map 602 may distinguish between water, a pontoon, a yacht, a small boat, a covered boat, or an obstacle, among other features and watercraft classes identified in images 608, 610.

Figure 7:
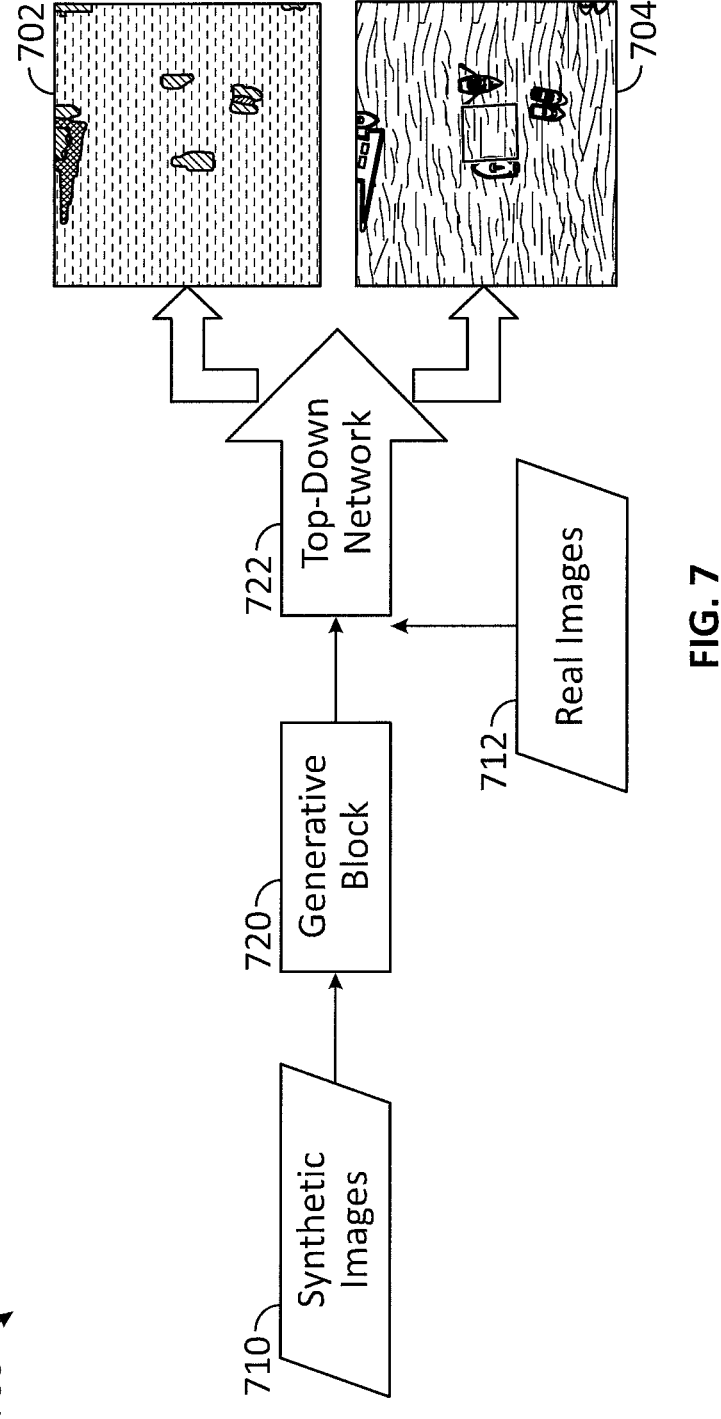
FIG. 7 illustrates an example system configured to generate a semantic map and a human viewable representation of an environment, according to one or more embodiments of the disclosure.

FIG. 7 illustrates an example system 700 configured to generate a semantic map 702 and a human viewable representation 704 of an environment, according to one or more embodiments of the disclosure. Except as otherwise noted below, system 700 may be similar to the systems described herein (e.g., system 200, system 500, system 600, etc.). For example, system 700 may include various neural networks, network portions, or the like to generate semantic map 702 based on synthetic images 710 and/or actual images 712, such as in a manner as described herein. In embodiments, synthetic images 710 may be used to train system 700, and real images 712 may be used during validation or runtime operations of system 700, similar to system 500 and/or 600, described above. System 700 may be implemented using object detection and classification system 52 and/or system 100, described above, such as to facilitate docking/undocking, among other maneuvering and/or navigation procedures, for mobile structure 130, as described herein. In embodiments, system 700 may be implemented by controller 182 and/or logic device 82, described above.

Semantic map 702 and human viewable representation 704 may be a produced pair of images/representations from monocular images. In such embodiments, semantic map 702 may be used for a first purpose, and human viewable representation 704 may be used for a second purpose different than the first purpose. For example, semantic map 702 may facilitate navigational control (e.g., as part of automatic docking/undocking), and human viewable representation 704 may facilitate a user experience (e.g., as part of a graphical user interface, to allow the user to explore an area, etc.). For example, an orthographic realistic image may be intuitive for a human operator, whereas the paired semantic map 702 may be ideal for an automated system. In such embodiments, human viewable representation 704 may include one or more features based on actual imagery such that human viewable representation 704 appears as a real image.

In embodiments, human viewable representation 704 has a POV shared with semantic map 702 and includes one or more image elements of actual and/or simulated images of the environment. Although illustrated is both including a BEV representation of the environment, semantic map 702 and human viewable representation 704 may include the same or a different POV. In embodiments, the features in semantic map 702 and human viewable representation 704 may exhibit a uniform scale, although other configurations are contemplated.

As shown, system 700 includes a generative block 720 and a top-down network 722 to generate semantic map 702 and human viewable representation 704. Generative block 720 may include the features of system 500 illustrated in FIG. 5, although other configurations are contemplated. Top-down network 722 may include various features to generate a human viewable representation 704 paired with a semantic map 702. For example, top-down network 722 may apply one or more imagery elements to semantic map 702 and/or generate human viewable representation 704 simultaneously with semantic map 702, as described below.

Figure 8:
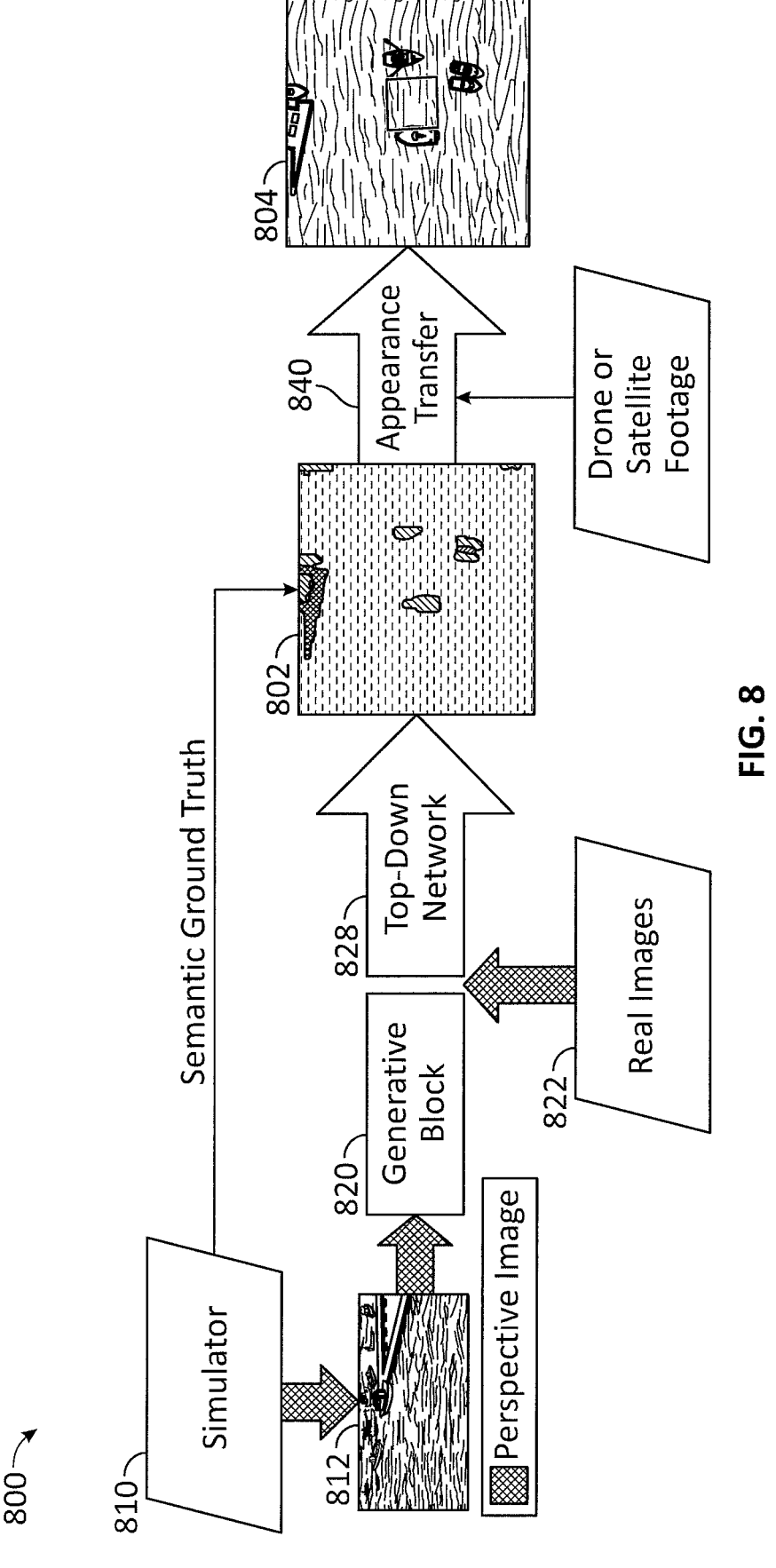
FIG. 8 illustrates another system configured to generate a semantic map and a human viewable representation of an environment, according to one or more embodiments of the disclosure.

FIG. 8 illustrates another system 800 configured to generate a semantic map 802 and a human viewable representation 804 of an environment, according to one or more embodiments of the disclosure. Except as otherwise noted below, system 800 may be similar to system 700, described above. For example, system 800 may be an exemplary implementation of system 700. System 800 may be implemented using object detection and classification system 52 and/or system 100, described above, such as to facilitate docking/undocking, among other maneuvering and/or navigation procedures, for mobile structure 130, as described herein. In embodiments, system 800 may be implemented by controller 182 and/or logic device 82, described above.

Referring to FIG. 8, system 800 includes a simulator 810 configured to generate one or more simulated images 812. Simulated images 812 may be fed to a generative block 820, which may be similar to system 500 of FIG. 5, described above. The output of generative block 820 and/or real images 822 may be fed to a top-down network 828, with top-down network 828 generating semantic map 802 therefrom, as described herein. As shown, semantic map 802 may be compared against an output of simulator 810 (e.g., a semantic ground truth) to train system 800, such as in a manner as described herein.

With continued reference to FIG. 8, system 800 includes an appearance transfer 840 to process semantic map 802. For example, semantic map 802 may be passed through appearance transfer 840 to produce a photorealistic view (e.g., human viewable representation 804). In embodiments, appearance transfer 840 may process one or more image elements of drone, satellite, or photo imagery to generate human viewable representation 804. In embodiments, a discriminator trained with adversarial loss can be applied between the output and satellite or drone imagery if available.

Figure 9:
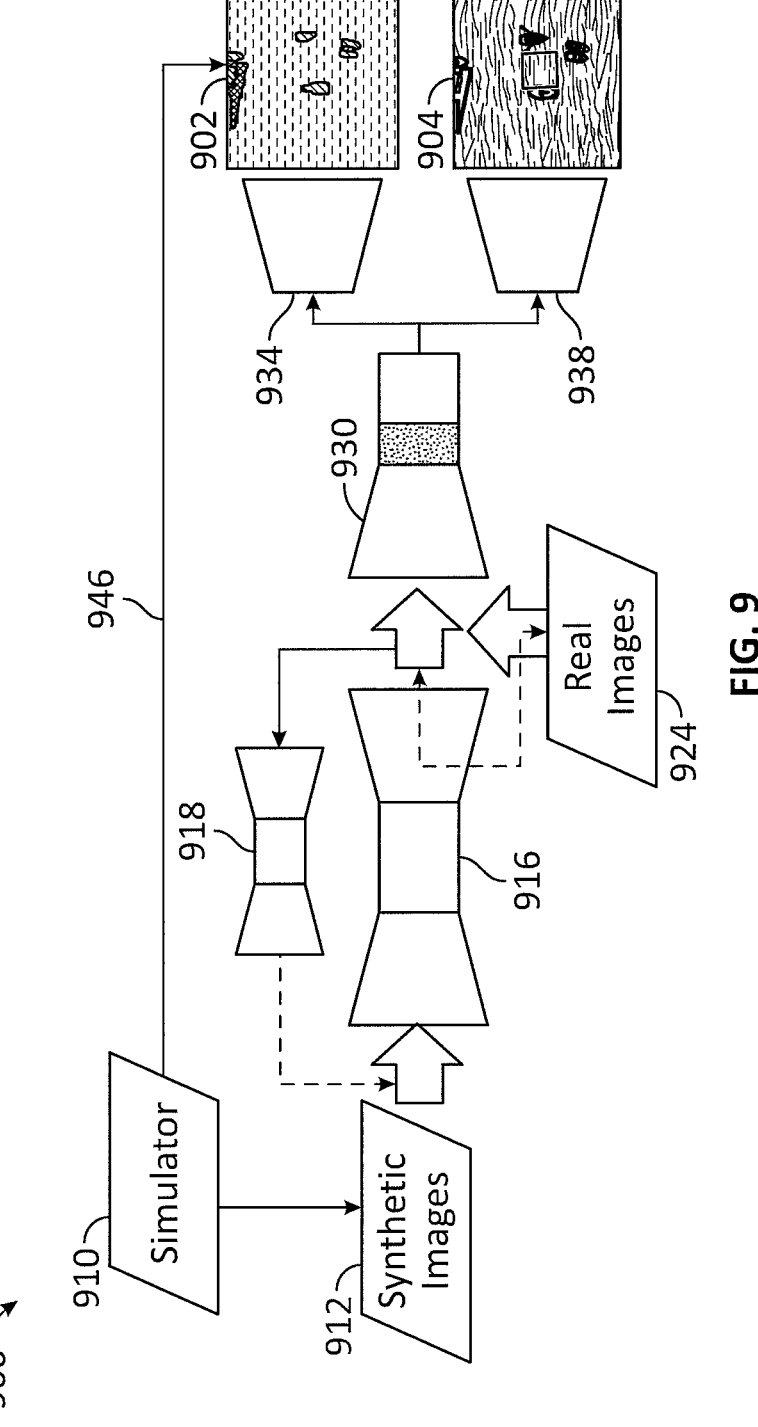
FIG. 9 illustrates another system configured to generate a semantic map and a human viewable representation of an environment, according to one or more embodiments of the disclosure.

FIG. 9 illustrates another system 900 configured to generate a semantic map 902 and a human viewable representation 904 of an environment, according to one or more embodiments of the disclosure. Except as otherwise noted below, system 900 may be similar to the various systems described herein. For example, system 900 may be an exemplary implementation of system 700. System 900 may be implemented using object detection and classification system 52 and/or system 100, described above, such as to facilitate docking/undocking, among other maneuvering and/or navigation procedures, for mobile structure 130, as described herein. In embodiments, system 900 may be implemented by controller 182 and/or logic device 82, described above.

Referring to FIG. 9, system 900 may be produce semantic map 902 and human viewable representation 904 simultaneously, rather than relying on an additional module or step. As shown, system 900 includes a simulator 910 configured to generate synthetic images 912, which are passed to a generative model 916. System 900 may include a reverse generator 918 to train system 900 using cyclic loss. The synthetic output of generative model 916 and/or real images 924 may be provided to a first network portion 930 for processing. First network portion 930, which may be referred to as an autoencoder, may use known geometric constraints (e.g., camera intrinsic calibration) to project to a top-down orthographic space. This latent space is then branched, with a second network portion 934 (e.g., a first decoder) generating semantic map 902 and a third network portion 938 (e.g., a second decoder) generating human viewable representation 904. Second network portion 934 may learn to produce semantic map 902, such as via a semantic supervision signal 946 from simulator 910, as described herein. Third network portion 938 may learn to produce human viewable representation 904, such as via real image supervision, as described herein.

Figure 10:
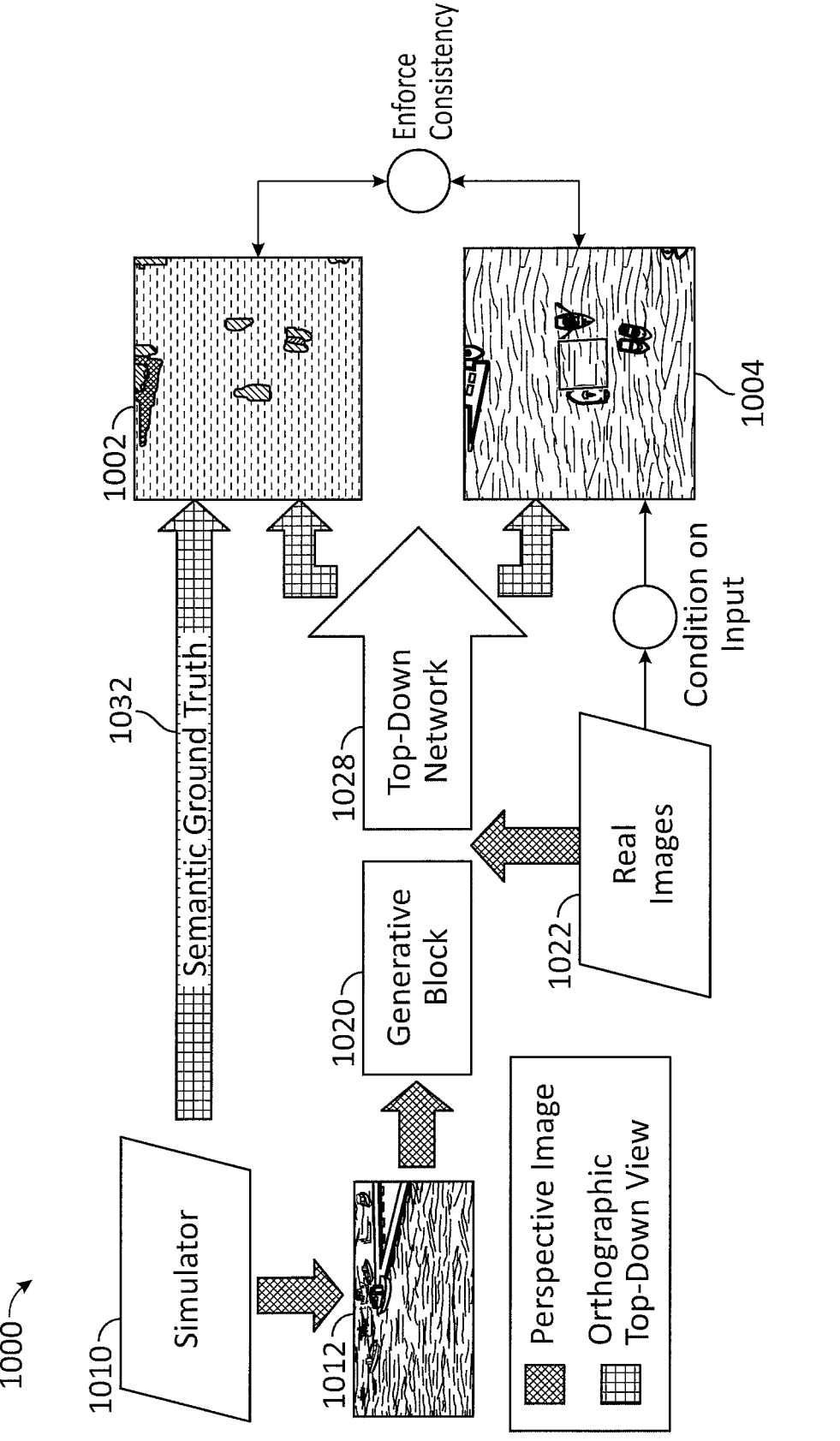
FIG. 10 illustrates a system configured to generate a semantic map and a human viewable representation of an environment, with the semantic map and human viewable representation conditioned based on actual and/or simulated information, according to one or more embodiments of the disclosure.

FIG. 10 illustrates a system 1000 configured to generate a semantic map 1002 and a human viewable representation 1004 of an environment, with semantic map 1002 and human viewable representation 1004 conditioned based on actual and/or simulated information, according to one or more embodiments of the disclosure. System 1000 may be implemented using object detection and classification system 52 and/or system 100, described above, such as to facilitate docking/undocking, among other maneuvering and/or navigation procedures, for mobile structure 130, as described herein. In embodiments, system 1000 may be implemented by controller 182 and/or logic device 82, described above.

Except as otherwise noted below, system 1000 may be similar to the various systems described herein. For example, system 1000 may include a simulator 1010 configured to generate one or more simulated images 1012. Simulated images 1012 may be perspective images fed to a generative block 1020, which may be similar to system 500 of FIG. 5, described above. The output of generative block 1020 and/or perspective real images 1022 may be fed to a top-down network 1028, with top-down network 1028 generating semantic map 1002 and/or human viewable representation 1004 therefrom, as described herein. As shown, semantic map 1002 may be compared against an output of simulator 1010 (e.g., an orthographic semantic ground truth 1032 output of simulator 1010) to train system 1000, such as in a manner as described herein.

If unlimited paired top-down data and outward-looking views were available (e.g., drone data and water-level views), the top-down data would serve as supervision for the human viewable representations described herein and could be semantically segmented using a standard semantic segmentation network. However, such data may be limited, such as in the maritime domain. In such embodiments, semantic map 1002 may be generated from simulation, at any desired scale, retaining both the geometry and overall layout of the scene. An adversarial discriminator may be trained in tandem with top-down network 1028 to enforce that the output (i.e., human viewable representation 1004) resembles real images 1022 (e.g., in appearance rather than geometry). Top-down network 1028, which may be referred to as a BEV network, may retain information from the original perspective image by conditioning the output on the original image. For example, real images 1022 can be warped into a surround view using traditional methods, and system 1000 may enforce that colors and textures are consistent with human viewable representation 1004 (e.g., in appearance rather than geometry). An additional module can be used to learn and compare the pertinent features in the perspective image and top-down space, similar to a discriminator in a traditional GAN, or an additional loss to regularize the top-down network's latent space.

Figure 11:
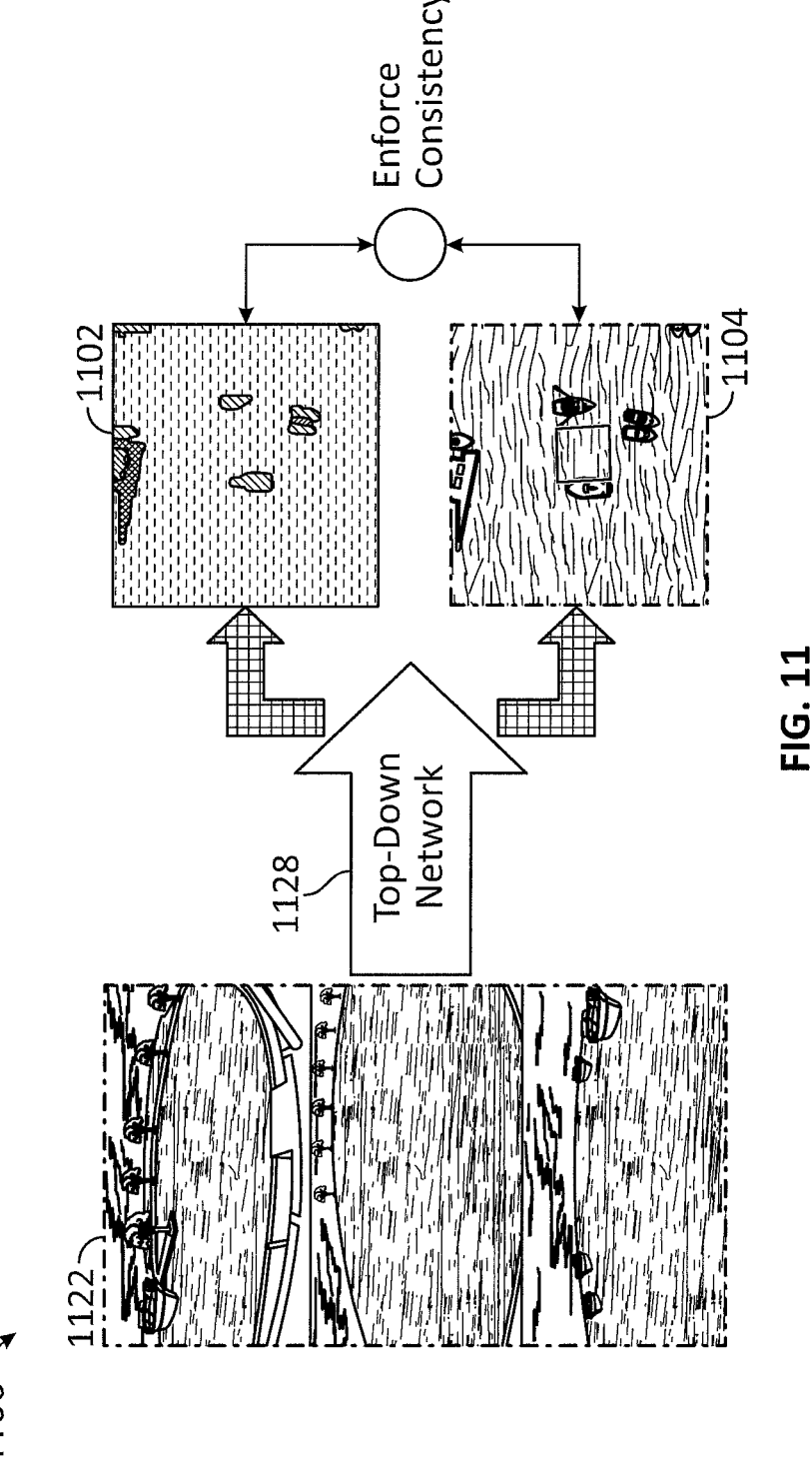
FIG. 11 illustrates a system configured to generate a semantic map and a human viewable representation of an environment, with the semantic map and human viewable representation conditioned against each other for consistency, according to one or more embodiments of the disclosure.

FIG. 11 illustrates a system 1100 configured to generate a semantic map 1102 and a human viewable representation 1104 of an environment, with semantic map 1102 and human viewable representation 1104 conditioned against each other for consistency, according to one or more embodiments of the disclosure. System 1100 may be implemented using object detection and classification system 52 and/or system 100, described above, such as to facilitate docking/undocking, among other maneuvering and/or navigation procedures, for mobile structure 130, as described herein. In embodiments, system 1100 may be implemented by controller 182 and/or logic device 82, described above.

Except as otherwise noted below, system 1100 may be similar to the systems described herein. For example, system 1100 may represent a streamlined and efficient implementation of system 1000, although other configurations are contemplated. In particular, at inference time, most of the training elements of system 1000 can be removed to create system 1100.

As shown, system 1100 includes a top-down network 1128 that processes real images 1122 to generate semantic map 1102 and/or human viewable representation 1104, such as similar to top-down network 1028 described above. As shown, real images 1122 capture different side views of the environment (e.g., relative to mobile structure 130).

Figure 12:
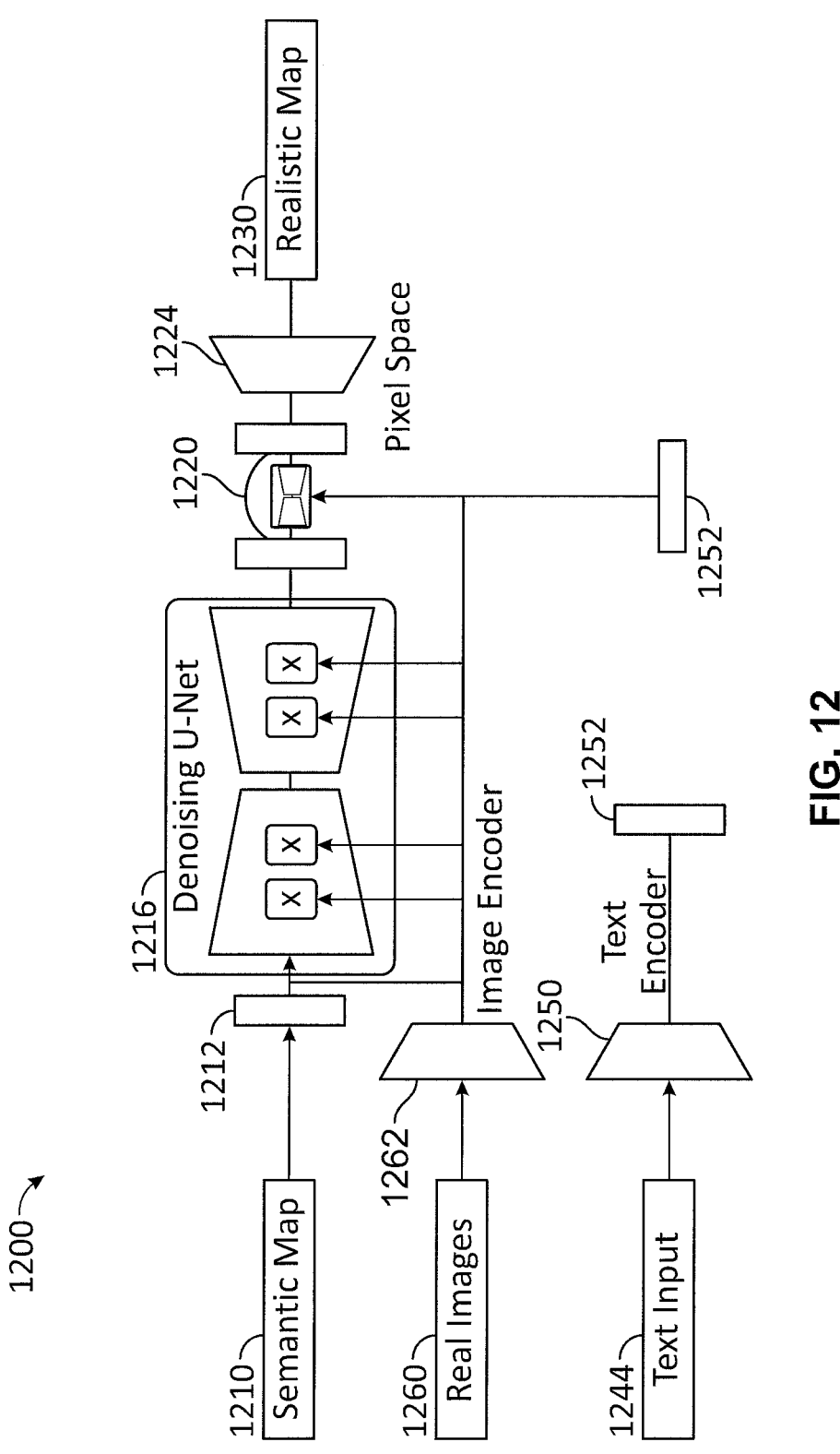
FIG. 12 illustrates a diffusion model, according to one or more embodiments of the disclosure.

FIG. 12 illustrates a diffusion model 1200, according to one or more embodiments of the disclosure. Model 1200 may be implemented using object detection and classification system 52 and/or system 100, described above, such as to facilitate docking/undocking, among other maneuvering and/or navigation procedures, for mobile structure 130, as described herein. In embodiments, model 1200 may be implemented by controller 182 and/or logic device 82, described above.

Referring to FIG. 12, a semantic map 1210 is concatenated with a Gaussian sample 1212 and inputted into a denoising U-Net 1216. U-Net 1216 includes architecture that allows the geometry of semantic map 1210 to be preserved throughout the de-noising process, while modifying its features. The denoising process is iteratively applied at block 1220, and then decoded back into the pixel space at block 1224 to generate a human viewable representation 1230.

With continued reference to FIG. 12, model 1200 may be conditioned to produce human viewable representation 1230 that resembles the environment. For example, U-Net 1216 may include cross-attention blocks 1238, such as to learn to use important features in a conditioning input. For example, a text input 1244 may be passed through a text encoder 1250 (e.g., trained with contrastive learning), and the text frozen at a text embedding 1252. As shown, the text embedding

1252 may be provided to model 1200 as a regularizing term, such as to ensure model 1200 does not stray too far from the intended result.

Additionally, model 1200 may condition on the environmental images. For example, real images 1260 may be provided to an image encoder 1262. In embodiments, individual images may be encoded and inserted into cross-attention blocks 1238. In this manner, model 1200 may learn to condition its output on the features in real images 1260.

During runtime operations, semantic map 1210 and the corresponding real image 1260 are provided to model 1200. Noise is added to semantic map 1210 via Gaussian sample 1212, and regularizing text embeddings 1252 are provided to restrain the model's output. Noise is removed at block 1224, and realistic human viewable representation 1230 is generated.

Embodiments of the disclosure include a method including receiving an image captured by a monocular camera having a first point of view (POV) of an environment including a plurality of features. The method further includes processing, by an artificial neural network (ANN), the captured image to generate a semantic map for the captured image, wherein the semantic map is associated with a second POV different from the first POV, and wherein the features exhibit a uniform scale in the semantic map.

The first POV may be a front, rear, or side view of the environment relative to a mobile structure. The second POV may be a bird's eye view (BEV) representation of the environment independent from the first POV.

The method may include receiving multiple images of the environment captured at different points in time, and processing, by the ANN, the captured images to generate a respective semantic map for each image of the captured images, wherein each respective semantic map is associated with the second POV, and wherein the features exhibit the uniform scale in each respective semantic map relative to each other. The method may include generating, by the ANN, an occlusion mask for each image of the captured images. Each occlusion mask may be paired with a semantic map generated for the same image of the captured images to define a plurality of semantic map and occlusion mask pairs. The method may include processing the semantic map and occlusion mask pairs to generate an updated semantic map of the environment. The method may include filling in occluded areas in the updated semantic map over time using one or more additional semantic maps created from corresponding additional captured images. The captured images may be captured by a plurality of monocular cameras having respective POVs.

The method may include at least one of aligning, using a coordinate frame transformation matrix, the semantic map to a coordinate frame of a mobile structure, or removing image drift from the semantic map.

The semantic map may be metrically accurate and/or an orthographic map to facilitate a boat docking maneuver.

The method may include generating a human viewable representation of the environment based on actual and/or simulated images of the environment.

The method may include training the ANN using a plurality of simulated images provided to the ANN.

Embodiments of the disclosure include a system including a monocular camera configured to capture an image of an environment comprising a plurality of features, the monocular camera having a first point of view (POV). The system further includes an artificial neural network (ANN) configured to process the captured image to generate a semantic map for the captured image, wherein the semantic map is associated with a second POV different from the first POV, and wherein the features exhibit a uniform scale in the semantic map.

The first POV may be a front, rear, or side view of the environment relative to a mobile structure. The second POV may be a bird's eye view (BEV) representation of the environment independent from the first POV.

Multiple images of the environment may be captured at different points in time. The ANN may be configured to process the captured images to generate a respective semantic map for each image of the captured images, wherein each respective semantic map is associated with the second POV, and wherein the features exhibit the uniform scale in each respective semantic map relative to each other. The ANN may be configured to generate an occlusion mask for each image of the captured images. Each occlusion mask may be paired with a semantic map generated for the same image of the captured images to define a plurality of semantic map and occlusion mask pairs. The semantic map and occlusion mask pairs may be processed to generate an updated semantic map of the environment. Occluded areas in the updated semantic map may be filled in over time using one or more additional semantic maps created from corresponding additional captured images. The captured images may be captured by a plurality of monocular cameras having respective POVs.

The semantic map may be aligned to a coordinate frame of a mobile structure using a coordinate frame transformation matrix. Image drift may be removed from the semantic map.

The semantic map may be metrically accurate and/or an orthographic map to facilitate a boat docking maneuver.

The ANN may be configured to generate a human viewable representation of the environment based on actual and/or simulated images of the environment.

The ANN may be a trained network based on a plurality of simulated images provided to the ANN.

Embodiments of the disclosure include a method including receiving a plurality of images captured by a plurality of monocular cameras having different points of view (POVs) of an environment. The method further includes processing, by an artificial neural network (ANN), the images to generate a plurality of semantic maps of the environment associated with the images, the semantic maps having a shared POV. The method further includes processing the semantic maps to generate a combined semantic map of the environment having the shared POV.

The method may include generating a human viewable representation of the environment, the human viewable representation having the shared POV and including one or more image elements of actual and/or simulated images of the environment. The images may include a plurality of features of the environment. The features may exhibit a uniform scale in the semantic map and the human viewable representation. The generating may include processing the combined semantic map and the actual and/or simulated images of the environment. The shared POV may include a bird's eye view (BEV) representation of the environment. The method may include processing one or more image elements of drone, satellite, or photo imagery to generate the human viewable representation.

The images may capture different side views of the environment relative to a mobile structure.

The method may include generating, by a simulator, a simulated semantic map of the environment. The method may include comparing the combined semantic map against the simulated semantic map to train the ANN.

The method may include processing actual images of the environment to generate the combined semantic map.

The combined semantic map may be metrically accurate and/or an orthographic map to facilitate a boat docking maneuver.

Embodiments of the disclosure include a system including a plurality of monocular cameras having different points of view (POVs) of an environment, the plurality of monocular cameras configured to capture a plurality of images. The system further includes an artificial neural network (ANN) configured to process the images to generate a plurality of semantic maps of the environment associated with the images, the semantic maps having a shared POV. The ANN is further configured to process the semantic maps to generate a combined semantic map of the environment having the shared POV.

The ANN may be configured to generate a human viewable representation of the environment, the human viewable representation having the shared POV and including one or more image elements of actual and/or simulated images of the environment. The images may include a plurality of features of the environment. The features may exhibit a uniform scale in the semantic map and the human viewable representation. The combined semantic map and the actual and/or simulated images of the environment may be processed to generate the human viewable representation. The shared POV may include a bird's eye view (BEV) representation of the environment. One or more image elements of drone, satellite, or photo imagery may be processed to generate the human viewable representation.

The images may capture different side views of the environment relative to a mobile structure.

The system may include a simulator configured to generate a simulated semantic map of the environment, wherein the combined semantic map is compared against the simulated semantic map to train the ANN.

Actual images of the environment may be processed to generate the combined semantic map.

The combined semantic map may be metrically accurate and/or an orthographic map to facilitate a boat docking maneuver.

Where applicable, various embodiments provided by the present disclosure can be implemented using hardware, software, or combinations of hardware and software. Also, where applicable the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the present disclosure. It should also be understood that numerous modifications and variations are possible in accordance with the principles of the present disclosure. Accordingly, the scope of the invention is defined by the following claims.

What is claimed is:

1. A method comprising:

receiving multiple images of an environment that are captured by one or more cameras, the environment comprising a plurality of features; and processing the captured images by an artificial neural network (ANN), wherein the processing comprises:

generating, for each captured image:

a semantic map, wherein the plurality of features that are represented in the semantic map have a uniform scale in the semantic map; and a corresponding occlusion mask identifying occluded image locations without a direct line of sight in the corresponding semantic map; and generating, from the semantic maps and the occlusion masks, a combined semantic map of the environment;

wherein generating the combined semantic map comprises filling one or more of locations that are identified as occluded for at least one of the semantic maps but not for another one of the semantic maps, and using the other one of the semantic maps to perform the filling.

2. The method of claim 1, wherein at least two of the multiple images of the environment are captured at different points in time.

3. The method of claim 1, wherein in the filling, the at least one of the semantic maps and the other one of the semantic maps are captured at different points of time.

4. The method of claim 1, wherein:

the one or more cameras comprise a plurality of monocular cameras mounted on a mobile structure and having respective different views of the environment relative to the mobile structure; and each of the semantic maps and the combined map comprises a bird's eye view (BEV) representation of the environment.

5. The method of claim 1, wherein:

the one or more cameras are mounted on a mobile structure; and the method further comprises at least one of:

aligning, using a coordinate frame transformation matrix, the semantic map to a coordinate frame of the mobile structure; or removing image drift from the semantic map.

6. The method of claim 1, wherein the one or more cameras are mounted on a boat, and the semantic map is an orthographic map to facilitate a boat docking maneuver for the boat.

7. The method of claim 1, wherein:

the semantic maps and the combined semantic map of the environment share a POV.

8. The method of claim 7, further comprising:

generating a human viewable representation of the environment, the human viewable representation having the same POV as the combined semantic map, wherein the generating comprises processing one or more of:

the combined semantic map;

one of more of the multiple images;

one or more simulated images of the environment;

one or more images provided by a drone;

one or more images provided by a satellite; and/or one or more photos.

9. The method of claim 8, wherein:

the features represented in the combined semantic map and the human viewable map have the uniform scale in the combined semantic map and the human viewable representation.

10. The method of claim 7, further comprising:

training the ANN using a plurality of simulated images; and/or training the ANN by:

generating, by a simulator, a simulated semantic map of the environment, and comparing the combined semantic map against the simulated semantic map.

11. A system comprising:

one or more cameras configured to capture multiple images of an environment comprising a plurality of features; and an artificial neural network (ANN) configured to process the captured images, wherein the processing comprises generating, for each captured image:

a semantic map, wherein the plurality of features that are represented in the semantic map have a uniform scale in the semantic map; and a corresponding occlusion mask identifying occluded image locations without a direct line of sight in the corresponding semantic map; and generating, from the semantic maps and the occlusion masks, a combined semantic map of the environment;

wherein generating the combined semantic map comprises filling one or more of locations that are identified as occluded for at least one of the semantic maps but not for another one of the semantic maps, and using the other one of the semantic maps to perform the filling.

12. The system of claim 11, wherein:

at least two of the multiple images of the environment are captured at different points in time.

13. The system of claim 1, wherein in the filling, the at least one of the semantic maps and the other one of the semantic maps are captured at different points of time.

14. The system of claim 12, wherein:

the one or more cameras comprise a plurality of monocular cameras mounted on a mobile structure and having respective different views of the environment relative to the mobile structure; and each of the semantic maps and the combined map comprises a bird's eye view (BEV) representation of the environment.

15. The system of claim 11, wherein:

the one or more cameras are configured to be mounted on a mobile structure; and the system is configured to perform at least one of:

aligning the semantic map to a coordinate frame of the mobile structure using a coordinate frame transformation matrix; and/or remove image drift from the semantic map.

16. The system of claim 11, wherein the one or more cameras are mounted on a boat, and the semantic map is an orthographic map to facilitate a boat docking maneuver for the boat.

17. The system of claim 11, wherein the semantic maps and the combined semantic map of the environment share a POV.

18. The system of claim 17, wherein:

the ANN is configured to generate a human viewable representation of the environment, the human viewable representation having the same POV as the combined semantic map, wherein the ANN is configured to generate the human viewable representation by processing one or more of:

the combined semantic map;

the image;

the additional images;

one or more simulated images of the environment;

one or more images provided by a drone;

one or more images provided by a satellite; and/or one or more photos.

19. The system of claim 18, wherein:

the features represented in the combined semantic map and the human viewable map have the uniform scale in the combined semantic map and the human viewable representation.

20. The system of claim 17, wherein:

the ANN is trained using a plurality of simulated images; and/or the ANN is trained by comparing the combined semantic map against a simulated semantic map of the environment.

\* \* \* \* \*